(12) United States Patent
Schaak et al.

(10) Patent No.: US 12,260,309 B1
(45) Date of Patent: Mar. 25, 2025

(54) SYSTEMS AND METHODS TO TRAIN AND/OR UTILIZE MACHINE LEARNING TO CLASSIFY SMART CONTRACTS IN TRANSACTIONS RECORDED IN IMMUTABLE DISTRIBUTED ELECTRONIC STORAGE

(71) Applicant: Hindsight VIP, Inc., Boardman, OR (US)

(72) Inventors: Chandler Skylo Schaak, Boardman, OR (US); Nicholas Kilbourn Fulton, Payette, ID (US)

(73) Assignee: Hindsight VIP, Inc., Boardman, OR (US)

( * ) Notice: Subject to any disclaimer, the term of this patent is extended or adjusted under 35 U.S.C. 154(b) by 0 days.

(21) Appl. No.: 18/913,686

(22) Filed: Oct. 11, 2024

(51) Int. Cl.
*G06Q 20/04* (2012.01)
*G06N 20/00* (2019.01)
(Continued)

(52) U.S. Cl.
CPC ............. *G06N 20/00* (2019.01); *G06Q 20/00* (2013.01); *G06Q 40/04* (2013.01)

(58) Field of Classification Search
CPC ......... G06N 20/00; G06Q 20/00; G06Q 40/04
See application file for complete search history.

(56) References Cited

U.S. PATENT DOCUMENTS 9,298,806 B1    3/2016  Vessenes
10,984,412 B2   4/2021  Islam
(Continued)

FOREIGN PATENT DOCUMENTS

WO     2023129365 A1    7/2023
WO   WO-2024074875 A1 *  4/2024  ............ G06F 21/30
WO   WO-2024187848 A1 *  9/2024  ............ G06F 21/577

OTHER PUBLICATIONS

Ortu et al.: Taxonomic insights into ethereum smart contracts by linking application categories to security vulnerabilities, 2024, Scientific Reports, nature.com, pp. 1-20. (Year: 2024).*

(Continued)

*Primary Examiner* — Bijendra K Shrestha
(74) *Attorney, Agent, or Firm* — Esplin & Associates, PC

(57) ABSTRACT

Systems and methods to train and/or utilize a machine learning model to classify smart contracts in transactions recorded on a transaction log stored in immutable distributed electronic storage, are described herein. Exemplary implementations may: obtain transaction information characterizing transactions recorded on a transaction log stored in immutable distributed electronic storage; obtain classification information identifying contract classes of the transactions; aggregate transaction information and classification information into model training information; provide the model training information to a machine learning model to train the machine learning model and generate a trained machine learning model; and/or perform other operations. Exemplary implementations may: provide transaction information of new transactions as input into a trained machine learning model; obtain output from the trained machine learning model; generate, from the output, classification information including contract classes of the new transactions; and/or perform other operations.

15 Claims, 4 Drawing Sheets

(51) Int. Cl.
    *G06Q 20/00*     (2012.01)
    *G06Q 40/04*     (2012.01)

(56) References Cited

U.S. PATENT DOCUMENTS

| | | | |
|---|---|---|---|
| 11,769,577 B1* | 9/2023 | Dods | G16H 20/10 |
| | | | 705/50 |
| 2021/0383395 A1 | 12/2021 | Galka | |
| 2022/0027900 A1 | 1/2022 | Suh | |
| 2023/0070625 A1 | 3/2023 | Gaur | |
| 2023/0328098 A1 | 10/2023 | Illum | |
| 2023/0376581 A1 | 11/2023 | Shear | |
| 2023/0376594 A1 | 11/2023 | Dalal | |
| 2024/0070233 A1 | 2/2024 | Blackburn | |
| 2024/0169257 A1 | 5/2024 | Sharma | |
| 2024/0330959 A1 | 10/2024 | Blanuša | |
| 2024/0405990 A1 | 12/2024 | Coughlan | |
| 2024/0428958 A1* | 12/2024 | Hwang | H04L 65/1083 |

OTHER PUBLICATIONS

Sm4rty: Smart Contract Diagramming for Security: A Visual Approach, Sep. 10, 2023, Medium, pp. 1-31 (Year: 2023).*
Pierro, Giuseppe, A.: Smart-Graph: Graphical Representation for Smart Contract on the Ethereum Blockchain, Mar. 2021, HAL Science, pp. 1-8. (Year: 2021).*

* cited by examiner

SYSTEMS AND METHODS TO TRAIN AND/OR UTILIZE MACHINE LEARNING TO CLASSIFY SMART CONTRACTS IN TRANSACTIONS RECORDED IN IMMUTABLE DISTRIBUTED ELECTRONIC STORAGE

FIELD OF THE DISCLOSURE

The present disclosure relates to specialized machine learning, and improvements in graphical user interfaces that leverage the machine learning.

BACKGROUND

Blockchain technology uses the blockchain, otherwise known as a distributed ledger, a public ledger, a transaction database, and/or other terms, to create a publicly verifiable record of transactions. The blockchain may be implemented through a network of independent and geographically distributed computers, often called nodes, which work together to manage and validate transactions. Each of the computers may store and maintain a copy of the blockchain. Transactions may involve smart contracts. A smart contract may refer to a digital agreement and/or set of functions. A smart contract may automatically execute and enforce terms of the agreement when certain conditions are met.

A "block explorer" may refer to an online tool that allows users to view and interact with information on a blockchain, which presents technical data in textual and/or table forms.

SUMMARY

Current block explorers are problematic. They present technical data in textual and/or table forms, which is not user-friendly for a percentage of the population that already finds blockchain confusing. The explorers confuse new users and do not aid in understanding blockchain concepts. These problems are compounded when it comes to understanding smart contracts. When a smart contract is deployed, the programming code of the smart contract may be recorded on the blockchain. Casual users, and even sophisticated users, may find it difficult to understand smart contracts, even when viewed from block explorers that are touted as user friendly. Deciphering code is simply not attainable for many users.

To address these and/or other problems, one or more implementations presented herein propose techniques to train and/or utilize machine learning to classify smart contracts recorded on a transaction log (e.g., blockchain) stored in immutable distributed electronic storage (e.g., a network of independent and distributed computers and/or other storage media). The classifications may provide a basis for generating graphical representations of the transactions, and/or may provide a basis for other features and/or functionality. Graphical representation may be achieved through visualizations with shapes (e.g., graph nodes), lines (e.g., graph edges), and/or other content to show transaction activities, and in particular, distinguish smart contracts from other entities participating in transactions, as well as distinguish between different types of smart contracts. By way of non-limiting illustration, different classes of smart contracts may be represented differently so as to visually distinguish between the different classes. These and/or other visual characteristics make the underlying information more understandable, ensuring users don't need to decipher complex strings of characters and/or code to gain insights.

These, along with other features and/or functionality presented herein, may be recognized by persons of ordinary skill in the art as providing sophisticated computer-based techniques to classify information recorded on a transaction log (such as a blockchain), which may lead to improvements upon graphical user interfaces, which leverage the classifications achieved through the various sophisticated technological approaches. Persons of ordinary skill in the art will recognize that feature(s) and/or functionality described herein are necessarily rooted in computer technology.

One or more implementations of a system configured to train and/or utilize machine learning to classify smart contracts recorded on a transaction log stored in immutable distributed electronic storage may include one or more of non-transitory electronic storage, one or more hardware processors (also referred to herein as "physical" processors) configured by machine-readable instructions, and/or other components. Executing the machine-readable instructions may cause the one or more hardware processors to facilitate training and/or utilizing specialized machine learning as described herein. The machine-readable instructions may include one or more computer program components. The one or more computer program components may include one or more of a transaction component, a classification component, a model component, and/or other components.

In some implementations of a system configured to train a machine learning model, the transaction component may be configured to obtain transaction information characterizing transactions recorded on a transaction log stored in immutable distributed electronic storage. By way of non-limiting illustration, the transaction information may include first transaction information which characterizes a first transaction and/or other transactions.

In some implementations, as part of training of a machine learning model, the classification component may be configured to obtain classification information identifying contract classes of one or more transactions. Individual transactions may be classified in individual contract classes. An individual contract class may represent an individual type of smart contract. By way of non-limiting illustration, the classification information may include first classification information which identifies a first contract class for the first transaction.

In some implementations, as part of a training of a machine learning model, the model component may be configured to aggregate one or more of transaction information, classification information, and/or other information into model training information. The model training information may be information suitable for training a machine learning model. By way of non-limiting illustration, the model component may be configured to provide the model training information and/or other information to a machine learning model to train the machine learning model. Training the machine learning model may generate a trained machine learning model. The trained machine learning model may be trained to generate output comprising contract classes of new transactions. "New" transactions may refer to transactions newly recorded on a transaction log after a model has been trained and/or to transactions that existed prior to the training but not used as part of the training.

In some implementations of a system configured to utilize a trained machine learning model, the transaction component may be configured to obtain transaction information characterizing new transactions recorded on a transaction log stored in immutable distributed electronic storage. By way of non-limiting illustration, the transaction information may include second transaction information which characterizes a second transaction. The second transaction may identify a first address and/or other addresses.

The model component may be configured to provide the transaction information characterizing individual ones of the new transactions as input into a trained machine learning model. By way of non-limiting illustration, the second transaction information may be provided as input into the trained machine learning model.

The classification component may be configured to obtain the output from the trained machine learning model and/or perform other operations.

The classification component may be configured to generate, from the output and/or other information, classification information. The classification information may include the contract classes of the new transactions. By way of non-limiting illustration, the classification information may include first classification information which identifies a contract class of the second transaction based on the output of the trained machine learning model.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1). As used herein, the phrase "configured to" is intended to be interpreted broadly, as "being capable of or suitable for performing" some function or feature, without requiring any adaptations to provide said function or feature.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
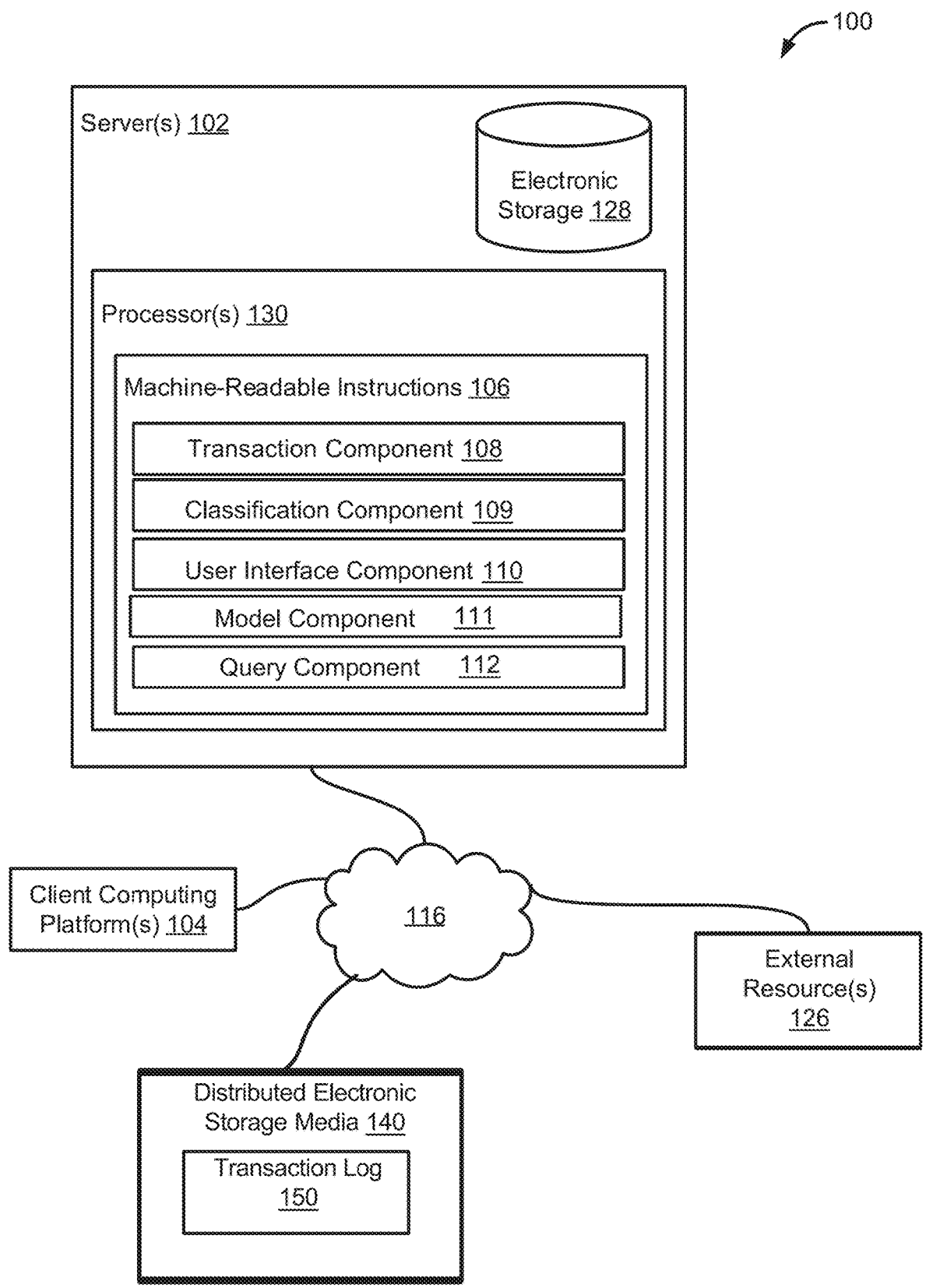
FIG. 1 illustrates a system configured to train and/or utilize machine learning to classify smart contracts recorded on a transaction log stored in immutable distributed electronic storage, in accordance with one or more implementations.

FIG. 1 illustrates a system 100 configured to train and/or utilize machine learning to classify smart contracts recorded on a transaction log 150 stored in immutable distributed electronic storage media 140 (also referred to as "immutable distributed electronic storage"), in accordance with one or more implementations. The classifications may facilitate generation of graphical representations of transactions and/or other functionality.

In some implementations, immutable distributed electronic storage media 140 may include a set of one or more electronic storage media on which the rights to, and/or transactions of, value are stored. In some implementations, immutable distributed electronic storage media 140 may be decentralized or centralized. In some implementations, immutable distributed electronic storage media 140 may be public or private. In some implementations, immutable distributed electronic storage media 140 may store a transaction log 150, and/or other information.

The transaction log 150 may include one or more records of transactions involving the transfer of value, various mechanisms of transfer, and/or other information. In some implementations, transaction log 150 may record indications of ownership rights and/or other information. In some implementations, value may be removed from transaction log 150 and added or recorded on another transaction log (not shown in FIG. 1) stored in immutable distributed electronic storage media 140 and/or other storage media. In some implementations, transfer of value may be facilitated by implementation of one or more smart contracts.

In some implementations, transaction log 150 may be in the form of one or more of an audit trail, an electronic ledger, and/or other forms. By way of non-limiting illustration, transactions recorded in transaction log 150 and stored in immutable distributed electronic storage media 140 may form a distributed electronic ledger. An example of a distributed electronic ledger may include a blockchain.

The transaction log 150 may comprise transaction records that are grouped or linked together. For example, a transaction log may be comprised of a set of transaction records, with an individual transaction record corresponding to one or more transactions. In relation to a blockchain, an individual record may be referred to as a block. For example, an individual record may be linked to one or more other individual records. Individual records may be linked or chained together to form a structure of records and/or a hierarchy of records, such as, a chain of records.

Transactions may be defined within individual records by information conveying transaction features values of transaction features, and/or other information. By way of non-limiting illustration, transactions may be defined by one or more of transaction identification ("transaction ID"), sender identification (e.g., sender addresses), recipient identification (e.g., recipient addresses), transaction fee(s), type of value transferred, amount of value transferred, timestamp when recorded (and/or timestamp when requested to be recorded), record location, transaction flow, function calls, progress characteristics, parameter values of smart contract parameters, smart contract code (and/or references to smart contract code), and/or other information. In some implementations, information such as function calls, parameter values of contract parameters, and/or other information may be included in, and/or otherwise defined by, smart contract code that may be included in, and/or referenced by, the information recorded to transaction log 150.

Transaction IDs may include unique identifiers that distinguish individual transactions from other transactions. A unique identifier for a transaction ID may comprise a string of alphanumeric characters.

Addresses may comprise unique identifiers that identify individual participants (e.g., senders and recipients) involved in the transfer of value recorded to the transaction log 150 and distinguish individual participants from other participants. A unique identifier for an address may comprise a string of alphanumeric characters.

A transaction fee may include the cost associated with processing a transaction.

A timestamp may include a date and/or time (e.g., exact date and/or time) when a transaction was recorded to the transaction log 150.

A record location may include an identification of where in the transaction log 150 a transaction was recorded. A record location may include, for example, a unique identifier associated with a specific record within a set of records forming the transaction log 150.

A function call may refer to the invocation of a specific function within a smart contract. When a function is called, it executes the code within that function, potentially modifying a contract's state and/or returning a value.

Parameter values of smart contract parameters may define rules, criteria, and/or other information upon which a smart contract operates. Contract parameter values may comprise the inputs provided when calling a function in a smart contract. These parameter values may be of various types, such as integers, strings, addresses, and/or arrays, and may determine how a function behaves and/or other information about data processing.

Progress characteristics may include a current state of progress of a transaction, and/or other information. A current state of progress may include one or more of amount of time lapsed, amount of time remaining, amount of steps completed, amount of steps remaining, and/or other measure of state of progress.

The transaction flow may include information which differentiates, for individual addresses, between transactions where value is being sent and where value is being received, and/or may include other information. By way of non-limiting illustration, the transaction flow may identify, for individual addresses and individual transactions, whether the individual transactions are "incoming" transfers of value or "outgoing" transfers of value. Accordingly, the transaction flow may identify, directly and/or indirectly, a direction in which value is "moving," e.g., from one address to another.

In some implementations, transaction flow for an individual transaction may include information referencing one or more prior transactions and/or information. The information referencing an individual prior transaction may include an indication of an amount of value available to be transferred by a given address (e.g., "unspent value"). The transaction flow of a given transaction may, at the conclusion of the given transaction, include and/or generate information indicating remaining unspent value. Remaining unspent value may be determined, for example, based on a given amount of value available to be transferred (obtained by referencing a prior transaction), less the value transferred in the given transaction. Accordingly, a subsequent transaction may reference the record of the given transaction to obtain an indication of an update to the amount of value available to be subsequently transferred.

In some implementations, the term "value" as used herein may refer to a digital representation of importance, monetary worth, and/or usefulness. Rights pertaining to value may be tracked, recorded, and/or otherwise registered on transaction log 150. Value may be expressed quantitatively as a unit of value, a subunit of value (e.g., a fraction or percentage of a unit of value), an amount of value (e.g., an amount of multiple units of value), and/or other expressions. Value may be uniquely identified and/or uniquely identifiable. Value may be conveyed in the form of one or more of tokens (e.g., tokens of value), coins, assets, credits, and/or other forms. A unit of value may be fungible if it is functionally and/or physically indistinguishable from other units of value. Value may be non-fungible if it is unique and distinguishable from other value (e.g., "one-of-a-kind"). Value may be semi-fungible if there is a set of a limited number of similar but distinguishable units of value.

In some implementations, individual units of value may be characterized by value types. Value types may include one or more of a currency type, utility type, a security type, a non-fungible type, a governance type, and/or other types.

Currency type value may comprise a store of monetary value. Currency type value may be fungible. Currency type value may include one or more of digital currency, cryptocurrency, and/or other considerations. By way of non-limiting illustration, currency type value may include one or more of Ethereum, Bitcoin, Solana, Litecoin, and/or other stores of monetary value.

Utility type value may be designed to provide access to specific features or services. Unlike currency type value, which primarily serves as a medium of exchange or store of monetary value, utility type value may be used within a specific application or network. By way of non-limiting illustration, utility type value may be used to pay for trading fees, participate in sales, access premium content, utilize certain functionalities within a decentralized application (dApp), and/or provide other features and/or functionality.

Security type value may represent ownership and/or investment in a real-world asset and/or financial instrument. Security type value may include security tokens and/or other representation of ownership and/or investment in a real-world asset and/or financial instrument.

Non-fungible type value may represent ownership of a unique item and/or content. Unlike fungible value (e.g., currency type value) which is interchangeable and identical in value, non-fungible type value may be distinct and may not be exchangeable on a one-to-one basis. In some implementations, units of value of the non-fungible type may exist as whole, indivisible units (e.g., cannot be divided into smaller subunits). By way of non-limiting illustration, non-fungible type value may include non-fungible tokens ("NFTs").

Governance type value may represent voting rights and/or influence over the decisions and/or operations of a decentralized organization or protocol (and may provide holders thereof with those rights).

Participants in the transactions (e.g., senders and/or recipients) may be identified by addresses. An individual address may be associated with an individual participant. Addresses may correspond to one or more of digital wallets, smart contracts, validator addresses, staking addresses, bridge addresses, exchange addresses (e.g., exchange account receive address), and/or other addresses.

The transaction log 150 may be maintained by one or more distributed computing platforms (not shown in FIG. 1). A distributed computing platform may include electronic storage media (e.g., immutable distributed electronic storage media 140) configured to store part or all of transaction log 150. In some implementations, a distributed computing platform may be implemented by one or more of client computing platforms, non-transitory electronic storage, and/or servers. An individual client computing platform, electronic storage, and/or server may form a "node" within the distributed computing platform. An individual node may store an individual instance of transaction log 150 (e.g., a copy of transaction log 150). An individual node may perform a consensus process by which some or all nodes agree on a state of transaction log 150, including whether transactions are valid and should be recorded. A consensus process may prevent double-spending, ensure integrity and consistency of transaction log 150, and maintain trust among participants. A consensus process may ensure a single version of transaction log 150 is stored among the distributed nodes, while further ensuring consistency and security without a central authority. By way of non-limiting illustration, the consensus process may include one or more of creating a transaction, broadcasting the transaction to the network (e.g., to some or all nodes), validating it at individual nodes (e.g., verifying transaction flow, sufficient funds, etc.), proposing the validated transaction be included in the transaction log, achieving consensus (by some or all nodes) that the transaction is valid, confirming compliance with other network-specific rules, recording/including the transaction in the transaction log, and/or other operations.

In some implementations, immutable distributed electronic storage media 140 may be publicly accessible. In some implementations, immutable distributed electronic storage media 140 may be private and/or permissioned. In some implementations, transaction log 150 may be append-only. In some implementations, existing records of transaction log 150 may not be altered or deleted, unless multiple copies are altered and/or consensus between nodes is achieved. This is unlikely to happen provided that the multiple instances (e.g., copies) are stored in different computing platforms, e.g., in different geographical locations. The multiple instances may be synchronized and/or synchronizable. By way of non-limiting illustration, when a node makes an update to its instance of the transaction log 150, the node may then propagate (e.g., broadcast) its updated instance to other nodes in the network. The other node(s) may then update their instance(s). If a node determines its instance does not match the instance(s) of one or more other nodes, the node may request one or more updates from one or more other nodes.

Individual records may be linked together in a manner that prevents tampering and/or may have other features that establish an "immutable" characteristic of this storage scheme. By way of non-limiting illustration, records may be linked together using a hash chain and/or digital signatures. Hash values may be generated using fixed-output-length one-way hashing functions that take variable-length input, and may be effectively impossible (or, at least, computationally infeasible) to reverse. As such, a hashing function may provide one-way encryption. Contents of individual records may be digitally signed in a manner that proves integrity and/or prevents tampering, e.g., by providing authentication, as well as non-repudiation.

In some implementations, individual transactions may be classified in individual transaction classes. The transaction classes may include one or more of a transfer class, a swap class, a stake class, a fee class, a creation class, a bridge class, one or more contract classes, and/or other classes.

A transaction of the transfer class may refer to a transfer of value from one address to another (e.g., one party sends a specific amount of value directly to another party).

A transaction of the swap class may refer to a swap/exchange of value of one type for value of another type. Swapping/exchanging may be carried out through an exchange. An exchange may refer to a platform through which users may initiate purchases, sales, and/or trades of value of varying types. By way of non-limiting illustration, for cryptocurrency exchanges, this may mean converting one cryptocurrency to another, and/or to fiat money. Individual exchanges may use multiple addresses for different purposes.

A transaction of the stake class may refer to the process of transferring value to a staking wallet and/or platform where value may be staked as part of a staking process. A staking process may involve depositing and/or holding value in association with a dedicated address to support operations of a network, such as validating transactions and/or securing a network. A staking process may hold value for an amount of holding time (e.g., 30, 60, 90, or 120 days). After completion of holding time, the value may be unlocked, e.g., deposited back in a user's wallet. Staking may be commonly used in Proof of Stake (POS) mechanisms, where network validators are chosen based on amount of value they stake. In return for staking value, users may earn rewards, often in the form of additional value. This is an incentive for participating and/or supporting a network.

A transaction of the fee class may refer to a transaction involving the payment of fees. By way of non-limiting illustration, fees may be paid to incentivize miners (in Proof of Work networks), validators (in Proof of Stake networks) for processing and confirming transactions, and/or other considerations.

A transaction of the creation class may refer to a creation/addition of new value in a transaction log and transferring the value to one or more specified addresses. Creation of new value may be referred to as "minting." In some implementations, a creation of new records (e.g., blocks in a blockchain) may be directly tied to the creation of new value because the process of record creation may involve the issuance of new value as rewards. This mechanism may ensure new value is introduced into the ecosystem regularly.

A transaction of the bridge class may refer to a transaction tied to bridge. A bridge may refer to a technology (e.g., protocol or service) that enables transfer of value and interoperability between different networks, e.g., different transaction logs. Bridges may facilitate the movement of value from one transaction log to another. For example, a bridge may facilitate the transfer of Bitcoin to an Ethereum-based decentralized application (DApp). Bridges may have other features and/or functionality.

A transaction of the contract class may refer to a transaction tied to operations/functions of one or more smart contracts. A smart contract may be a digital agreement and/or set of functions. A smart contract may automatically execute and enforce terms of the agreement when certain conditions are met. A smart contract may carry out the terms of an agreement and/or set of functions, with or without intermediaries. In some implementations, terms may be carried out through execution of a series of steps. Smart contracts may be designed to perform a wide range of transfers and/or functions that are tied to their specific operating features and/or functionalities. Such transfers may include one or more of value transfers, value creation, scheduled and/or conditional transfers, complex financial operations (e.g., lending, borrowing, staking, yield farming, etc.), escrow services, multi-signature transactions, governance and voting, royalty payments, staking, bridges, and/or other transfers.

A transaction of the contract class may be recorded in a transaction log with computer programming code of a smart contract and/or other information indicative of a smart contract's involvement (e.g., a reference or pointer to contract code recorded in one or more other transactions and/or storage locations). In some implementations, smart contract code recorded on a transaction log may include one or more of source code, bytecode, and/or other considerations. The source code may include the human-readable version written in a programming language. Bytecode may include a compiled, machine-readable format of a smart contract, derived from the source code. Converting source code to bytecode may involve a compilation process, where a compiler takes source code and translates it into bytecode. In some implementations, bytecode may be recorded on a transaction log, while source code may not. Some platforms may allow developers to publish the source code in a transaction log and/or other public resource for transparency.

In some implementations, many contract classes for transactions may be defined in order to represent many different types of smart contracts. Different contract classes may represent different types of smart contracts (e.g., smart contracts intended to execute different functionality). Further, the present disclosure envisions not only classifying smart contracts executing known functionality, but leaves open the possibility of identifying and classifying emerging smart contracts that execute new (e.g., previously unknown and/or undefined) functionality. The use of specialized machine learning of the present disclosure makes this possible.

In some implementations, contract classes (which may be referred to individually as contract subclasses) may include one or more of an exchange contract class, a liquidity contract class, a bridge contract class, a gambling contract class, a stake contract class, a proxy contract class, an initial offering contract class, a factory contract class, and/or other classes.

An exchange contract class of transactions may be associated with one or more of function(s) including a swap function (e.g., "swapTokens( )"); a transaction pattern such as relatively high frequency of value transfers; contract parameter values such as pairs of tokens exchanged, slippage rates, fees applied, and/or other values; and/or other information.

A liquidity contract class of transactions may be associated with one or more of function(s) including value adds (e.g., "addLiquidity( )"), value removal (e.g., "removeLiquidity( )"), and/or other functions; contract parameter values such as total value locked (TVL), asset rations, liquidity provider tokens, and/or other values; and/or other information.

A bridge contract class of transactions may be associated with one or more of function(s) including a lock function, a mint function, and/or other functions; a transaction pattern including cross-network interactions; contract parameter values such source and destination network, wrapped token usage, and/or other values; and/or other information.

A gambling contract class of transactions may be associated with one or more of function(s) including bet placement (e.g., "placeBet( )"), winning payouts (e.g., "payoutWinnings( )"), and/or other functions; contract parameter values such as randomness sources, bet amounts, payout structures, and/or other values; and/or other information.

A stake contract class of transactions may be associated with one or more of function(s) including stake initiation (e.g., "stake( )"), stake closure (e.g., "unstake( )"), reward payouts (e.g., "claimRewards( )"), and/or other functions; contract parameter values such as staking durations, reward mechanism, total staked amounts, and/or other values; and/or other information.

A proxy contract class of transactions may be associated with one or more of function(s) including delegation (e.g., "delegatecall( )") and/or other functions; contract code with minimal logic; contract parameter values such as implementation address, upgrade histories, and/or other values; and/or other information.

An initial offering contract class of transactions may be associated with one or more of function(s) including value sales (e.g., "buyTokens( )") and/or other functions; contract parameter values such as sales caps, contribution limits, vesting schedules, and/or other values; and/or other information.

A factory contract class of transactions may be associated with one or more of function(s) including creation (e.g., "createContract( )") and/or other functions; contract parameter values such as quantity of contracts deployed, types of contract deployed, and/or other values; and/or other information.

It is noted that transactions of one or more of the transaction classes described herein may implicitly, inherently, and/or expressly also be part of one or more smart contracts. This is because a transaction may not only have features that would lead to a particular transaction classification, but may also be part of an execution of a smart contract. Such transactions may have a further classification into one or more of the contract classes. Accordingly, a classification of a transaction into one of the transaction classes (e.g., one or more of a transfer class, a swap class, a stake class, a fee class, a creation class, and/or other classes) may be accompanied by another classification into one or more of the contract classes. By way of non-limiting illustration, a bridge class transaction that is part of a bridge process may be one of the operations of a smart contract for gambling. Thus, the transaction may be classified in the bridge class, as well as the gambling contract class. By way of non-limiting illustration, a stake class transaction that is part of a staking process may also be one of the operations of a smart contract executing a series of stakes. Thus, the transaction may be classified in the stake class, as well as the stake contract class.

Individual addresses may be classified in individual address classes. In some implementations, classifications of addresses may be based on transaction classifications of the transactions in which the addresses are identified, and/or other information. By way of non-limiting illustration, an address of the stake class may be classified as such based on the address having been identified in one or more stake class transactions. In some implementations, classifications of addresses may be based on publicly known classifications.

The address classes may include one or more of a wallet class, a validator class, a stake class, a bridge class, an exchange class, one or more contract classes, and/or other classes. Some of these classes may overlap with some of the transaction classes.

An address of a wallet class may correspond to a digital wallet. A digital wallet may refer to an electronic tool (e.g., software application) used to manage value and/or other information. By way of non-limiting illustration, a digital wallet may store information such as payment credentials, user details, and/or other information. Payment credentials may include one or more of banking information, key information, and/or other information. The key information may include public and/or private keys. Public keys may be used to receive funds and/or to verify transactions. Public keys may be shared with others without compromising security. Private keys may be used to sign transactions, and serve as proof the owner has the right to access and/or initiate transfers of value associated with a public key. Private keys may remain confidential. Digital wallets may use encryption algorithms to protect private keys. An address of the wallet class may participate in the transfer class of transactions and/or other classes of transactions.

An address of the validator class may correspond to a validator (e.g., validator address). A validator may refer to a participant that checks and confirms transactions and/or transaction records. A validator may be tasked with ensuring transactions are valid and that a network operates correctly. Validators are crucial for maintaining a network's security and integrity. Validators may check and confirm that transactions are valid according to the network's rules. This may involve ensuring that transactions are correctly signed, inputs are available, and there are no double-spends. Validators may provide new transaction records to add to a transaction log. They may select and bundle valid transactions into a new record, which is then submitted to the network for approval. Validators may participate in a consensus mechanism to agree on the state of a transaction log. They help achieve consensus on which transactions and records are valid. Validators may perform a series of steps in the execution of their functionality. Validators may perform other functionality.

An address of a stake class may correspond to a staking wallet. A staking wallet may participate in a staking process or similar consensus functionality. A staking wallet may manage and/or track value that is being used to participate in a staking process. A staking wallet may ensure value is securely "held" and/or managed in accordance with a network's staking rules and/or protocols. Stake class addresses may be identified in the stake class of transactions.

An address of a bridge class may correspond to a bridge. A bridge class of address may participate in a bridge process. Bridge class addresses may be identified in the bridge class of transactions.

An address of an exchange class may correspond to an exchange participating in swaps/exchanges of value. Exchange class of addresses may be identified in the exchange class of transactions.

An address of a contract class may correspond to a smart contract (e.g., contract address). An address may correspond to a smart contract by virtue of one or more of the address deploying the smart contract, the address being identified in the smart contract as a source address from which funds are retrieved and/or received, the address being identified in the smart contract as a destination address to which funds are transferred, and/or the address having other characteristics that conveys a correspondence with a smart contract.

In some implementations, many contract classes for address may be available in order to represent the many different types of smart contracts, similar to how transactions are classified. That is, addresses of one or more of the address classes described herein may implicitly, inherently, and/or expressly also be identified in one or more smart contracts, and thus may have a further classification into one or more of the contract classes, similar to transactions. This is because an address's association with a transaction executing some transaction functionality that would lead to a particular address classification, may be accompanies by the address being specifically identified as a source and/or destination address in accordance with a smart contract. Accordingly, a classification of an address into one of the address classes may be accompanied by another classification into one of the contract classes. By way of non-limiting illustration, a bridge class address identified in a transaction involving a bridge process may also be involved in (e.g., identified by) a smart contract intended to execute a series of operations used for gambling. Thus, the address may be classified in the bridge class, as well as a gambling contract class. By way of non-limiting illustration, a stake class address identified in a transaction involving a staking process may be performing the staking process as part of a smart contract. Thus, the address may be classified in the stake class, as well as a stake contract class.

In some implementations, a total amount of value associated with an address (e.g., "held" by that address) may be determined by examining the transaction log 150, identifying transactions that identify that address, balancing the incoming and outgoing transfers of value associated with that address, determining a total amount of value from the balancing, and/or other processes. By way of non-limiting illustration, the total amount of value associated with an address may be determined by the sum of incoming transfers of value associated with that address less the sum of outgoing transfers of value associated with that address.

In some implementations, transaction log 150 may be accessible via a mobile application and/or a website. Traditionally, a mobile application and/or website may provide a mechanism to search a transaction log, and/or present the results of a search in a table format comprising a table of text. In the context of blockchain, these tools may be referred to as "block explorers." Current block explorers are problematic. They present technical data in textual and/or table forms, which is not user-friendly for a percentage of the population that already finds blockchain confusing. The explorers confuse new users and do not aid in understanding blockchain concepts, especially concepts around smart contracts, their functionally, and/or how they interact with addresses.

To address these and/or other problems, one or more implementations of the system 100 presented herein propose techniques to train and/or utilize machine learning to classify smart contracts, and/or generate graphical representations of transactions such that different smart contracts may be visually represented. In some implementations, system 100 may include one or more of one or more servers 102, one or more client computing platforms 104, external resource(s) 126, immutable distributed electronic storage media 140, and/or other components. Server(s) 102 may be configured to communicate with one or more client computing platforms 104, one or more external resources 126, immutable distributed electronic storage media 140, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Individual client computing platforms may be remote from other individual client computing platforms. As used herein, a client computing platform may be referred to as a "remotely located" client computing platform.

External resource(s) 126 may include sources of information outside of system 100, external entities participating with system 100, and/or other resources. By way of non-limiting illustration, external resource(s) 126 may include one or more of other storage media storing other transaction logs, third-party websites and/or information sources storing characterizations of transactions recorded on transaction log 150 and/or other transaction logs, third-party websites and/or information sources storing classifications of address and/or transactions recorded on transaction log 150 and/or other transaction logs, and/or other resources. In some implementations, some or all of the functionality attributed herein to external resource(s) 126 may be provided by resource(s) included in system 100.

Server(s) 102 may include one or more of non-transitory electronic storage 128, one or more processors 130 configured by machine-readable instructions 106, and/or other components. The non-transitory electronic storage 128 may store one or more of transaction information, classification information, model training information, user interface information, and/or other information. Machine-readable instructions 106 may include one or more instruction components. The instruction components may include computer program components. Executing the machine-readable instructions 106 may cause server(s) 102 to facilitate classifying smart contracts in transactions recorded on transaction log 150 stored in immutable distributed electronic storage media 140. The computer program components may include one or more of a transaction component 108, a classification component 109, a user interface component 110, a model component 111, a query component 112, and/or other components.

The transaction component 108 may be configured to obtain transaction information and/or other information. The transaction information may characterize transactions recorded on transaction log 150 stored in immutable distributed electronic storage media 140 and/or other storage media. The transactions may be characterized in the transaction information by transaction feature values of transaction features, and/or other information. In some implementations, transaction features may include one or more of an address feature, a timing feature, a value transferred feature, a fee feature, a function call feature, a contract parameter feature, a transaction pattern feature, a transaction flow feature, an interaction feature, and/or other features.

The value(s) of an address feature of a transaction may include identification of one or more addresses involved in the transaction (e.g., sender identification, recipient identification, and/or other information).

The value(s) of a timing feature of a transaction may include one or more of timestamp when recorded (and/or timestamp when requested to be recorded), progress characteristics, temporal spikes, and/or other time-based features.

The value(s) of a value transferred feature of a transaction may include characterization(s) of value transferred. The characterization(s) of value transfer may include one or more of type(s) of value transferred, amount of value transferred, amount of value associated with a given addresses (e.g., a "balance" of value associated with an address), and/or other information.

The value(s) of a fee feature of a transaction may describe the transaction fee(s) paid (e.g., type of value, amount of value, and/or other information) as part of the transaction.

The value(s) of a function call feature of a transaction may include and/or describe the functions of a smart contract. Functions may include and/or be related to one or more of swap functions, bridge function, validation functions, oracle usage, and/or other functions. The value(s) of a function call feature may be determined and/or derived from smart contract code.

The value(s) of a contract parameter feature of a transaction may include the parameter values of smart contract parameters of a smart contract. The value(s) of a contract parameter feature may be determined and/or derived from smart contract code.

The value(s) of a transaction pattern feature of a transaction may describe transaction patterns of instances of the transaction. By way of non-limiting illustration, the transaction patterns may include one or more of a frequency of execution of instances of the transaction, a quantity of instances of execution of the transaction (e.g., a transaction volume), cross-network interactions (e.g., bridge interactions), and/or other transaction patterns associated with instances of the transaction. In some implementations, a transaction frequency feature, a transaction volume feature, a cross-network feature, and/or other pattern-related features may be separate and distinct features. The value(s) of a transaction pattern feature of a given transaction may be determined from the given transaction and/or a set of transactions (e.g., other instances of the given transaction).

The value(s) of a transaction flow feature of a transaction may describe the transaction flow of the transaction.

The value(s) of an interaction feature of a transaction may describe interaction information. The interaction information may convey a transaction's interaction with various entities. Interaction may be conveyed by one or more of a quantity of unique addresses associated with the transaction, an interaction frequency of the unique addresses, and/or other information. By way of non-limiting illustration, a transaction (and/or addresses identified in a transaction) may be associated with one or more interactions with a decentralized application (dApp) and/or other entities that may impact, and/or may be impacted by, transactions recorded on a transaction log.

In some implementations, obtaining transaction information may include one or more of retrieving the transaction information, receiving the transaction information, deriving the transaction information from other information, and/or other processes. In some implementations, transaction information may be received and/or retrieved directly from transaction log 150. That is, the transaction information may comprise the information stored in the transaction log 150 defining the transactions.

In some implementations, obtaining transaction information may include one or more of obtaining the information stored in the transaction log 150, deriving the transaction information from the information stored in the transaction log 150, and/or other processes. By way of non-limiting illustration, the information stored in the transaction log 150 defining the transactions may not directly include the information structured in accordance with the transaction features described herein. Instead, the transaction feature values of the transaction features of transactions may be derived, inferred, and/or otherwise determined from information stored in the transaction log 150 itself. In some implementations, the transaction information may be obtained from a source (e.g., an external resource) which has derived the transaction information from information stored in the transaction log 150 and/or from other information sources.

In some implementations, generating transaction feature values of transaction features of transaction may be accomplished through manual labeling of information recorded on transaction log 150 and/or one or more automated labeling techniques. Automated labeling techniques may include automated labeling software. An example of such software includes Amazon SageMaker Ground Truth. In some implementations, users may manually verify a representative sample of an output of automated labeling to ensure accuracy. Verification may be used to update the labeling.

In some implementations, transactions may be defined within individual records of transaction log 150 without some of the information described, for example without specifically including transaction flow, transaction patterns, and/or other information as described herein. Instead, transaction component 108 may be configured to derive transaction information from information that is stored in an individual transaction record and/or other information. By way of non-limiting illustration, information such as sender identification (e.g., sender addresses), recipient identification (e.g., recipient addresses), value transferred, and/or other information stored in transaction log 150 for one or more transactions may be used to derive a transaction flow for an individual transaction. By way of non-limiting illustration, transaction component 108 may be configured to determine that an address identified as a recipient address should have a designation of being associated with an "incoming" transfer of value by virtue of its "recipient" characterization within the transaction log 150 itself. By way of non-limiting illustration, transaction component 108 may be configured to determine that an address identified as a sender address should have a designation of being associated with an "outgoing" transfer of value by virtue of its "sender" characterization within the transaction log 150 itself. By way of non-limiting illustration, transaction component 108 may be configured to derive, infer, and/or otherwise determine transaction information in other ways from one or more information sources.

Model Training

The system 100 may implement one or more models to classify smart contracts and/or perform other classification. In some implementations, a model may comprise one or more of a machine learning model, a probabilistic model, a decision tree model, and/or other models. In some implementations, different models may be utilized at different stages of the system 100.

In some implementations, a model may utilize one or more of an artificial neural network, naïve Bayes classifier algorithm, k-means clustering algorithm, support vector machine algorithm, linear regression, logistic regression, decision tree-based model, random forest, nearest neighbors, matrix factorization (e.g., a class of a class of collaborative filtering algorithms), a classifier, a histogram, Retrieval-Augmented Generation (RAG), natural language processing, and/or other approaches. Training a model may utilize one or more of deep learning, supervised learning, semi-supervised learning, unsupervised learning, reinforcement learning, low-code techniques, and/or other techniques.

In supervised learning, a model may be provided with a known training dataset that includes desired inputs (e.g., transaction information) and outputs (e.g., classification information), and the model may be configured to find a method to determine how to arrive at those outputs based on the inputs. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labelled and unlabeled training information. Labelled data may comprise information that has meaningful tags (or "labels"), so that the model can understand the information (e.g., model training information as described herein), while unlabeled information may lack those specific tags. By using this combination, the machine learning model may learn to label unlabeled data.

For unsupervised learning, a model may study model training information to identify patterns. There may be no answer key or human operator to provide instruction. Instead, the model may determine the correlations and relationships by analyzing training information. In an unsupervised learning process, the model may be left to interpret large information sets and address the training information accordingly. The model may try to organize training information in some way to describe its structure. This might mean grouping training information into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values (e.g., classification information). By defining the rules, the model then tries to explore different options and possibilities, monitoring and evaluating individual results to determine which one is optimal to generate correspondences. Reinforcement learning teaches the model trial and error. The model may learn from past experiences and adapt its approach in response to the situation to achieve the best possible result.

Machine learning models may operate by generating inferences, e.g., conclusions drawn about unseen or unmentioned information from learned knowledge. Generating inferences may refer to a process of making predictions, deductions, and/or conclusions based on patterns and/or relationships learned by a model. Inferences are a powerful aspect of machine learning, enabling models to reason, make connections, and/or provide insightful responses.

The process of generating inferences may involve using patterns and/or relationships learned from large amounts of information. Inference generating processes may rely on a model's ability to store information about concepts and/or relationships in its internal representations (e.g., knowledge encoding), identify similarities and/or connections between pieces of text, concepts, and/or entities (e.g., pattern recognition), apply learned patterns and/or relationships to new, unseen situations (e.g., generalize), and/or draw logical conclusions from encoded knowledge and/or recognized patterns (e.g., reason). In some implementations, inferences may be one or more of explicit, implicit, abductive, and/or deductive. Explicit inferences may be direct conclusions that may include specific pieces of information. Implicit inferences may be suggested and/or implied conclusions. Abductive inferences may be educated guesses or hypotheses based on incomplete information. Deductive inferences may be conclusions drawn with certainty, using logical rules and evidence.

The model component 111 may be configured to provide model training information to a model to train, retrain, fine-tune, adapt, and/or otherwise prepare the model for use. By virtue of current technology surrounding machine learning, the act of providing the model training information to a model may cause the model to be trained to thereby generate a trained model. The trained model may be trained to generate certain output as described herein.

In some implementations, model component 111 may be configured to organize model training information into input/output training information pairs used to train a model. Training may be accomplished by providing that information during a training (and/or retraining, refining, and/or adapting) phase of that model. An individual input/output training information pair may include individual input training information (e.g., sample of inputs), individual output training information (e.g., sample of desired outputs), and/or other information.

One or more of models used by system 100 may be continually refined (or "fine-tuned") as time goes on. In some implementations, a model may be continually refined as information is collected and/or model parameters are adjusted manually or in response to some trigger event.

Fine-tuning a trained model process may include one or more of preparation, model selection, training, evaluation, and/or other operations. A preparation step may prepare a set of labeled training information examples in a specific format (e.g., CSV, JSON). The model selection step may choose a pre-trained model and select a fine-tuning method. The training step may train the pre-trained model on the prepared set of labeled training information examples, updating weights based on error between predictions and actual labels. An evaluation step may evaluate a model's performance on a validation set, and adjust parameters as needed.

In some implementations, a model may draw from one or more information sources to perform one or more operations. These information sources may include natural language sources (e.g., sources of text in prose), embeddings, and/or other information sources.

An embedding may comprise a mathematical representation of a word, a character, and/or phrase as a vector in a high-dimensional space. A vector may denote semantic meaning and/or relationships of a word, a character, and/or phrase allowing a model to perform its tasks. A collection of embeddings may be generated for a set of information. The collection of embeddings may make up an embeddings database.

Embeddings may allow models to understand and process information more effectively. The process of embedding information may map data points to a vector space, where individual dimensions represent individual features and/or attributes. This space may allow for mathematical operations and comparisons between data points. Embeddings may form distributed representations, meaning that information may be spread across multiple dimensions, rather than being localized to a single dimension. Embeddings may denote semantic meaning of points in the vector space, like the relationships between words or images, by measuring similarity and distance between points, using metrics like cosine similarity or Euclidean distance. Embeddings may reduce the dimensionality of high-dimensional data, making it more tractable for models to process.

Embeddings may enable a model to process text as numerical inputs, capture subtle semantic relationships, facilitate generalization to unseen information, and/or perform other processes such as classification, clustering, and/or generation. The general process of generating embeddings may include one or more of collecting input information, tokenizing the input information, implementing an embedding generation technique, extracting embeddings, and/or other operations. In some implementations, one or more implementations of model training information described herein may be refer to a vector space representation of the model training information within an embeddings database.

Tokenizing may include splitting text into individual tokens, e.g., text may be broken down into individual tokens, such as words, subwords, and/or characters. Each token may be represented as a vector in a high-dimensional space (e.g., 100-1000 dimensions). Individual vector values of individual vectors may represent an individual token's semantic features. The semantic features may include one or more of meaning, context, relationships with other tokens, syntactic roles, grammatical roles, and/or other features. In some implementations, use of a high-dimensional vector space may result in tokens with similar meanings or contexts being mapped to nearby points in the vector space, enabling a model to capture nuances in language. In some implementations, a model may be configured to learn to adjust embedding vectors during training to refine an understanding of the tokens and/or their relationships.

Implementing an embedding generation technique may include one or more of choosing an embedding generation technique and/or pre-trained model (e.g., model selection), training the model on prepared data, and/or other steps. Embedding generation techniques may include one or more of word embeddings (e.g., Word2Vec, GloVe) that may represent words as vectors, character embeddings that may represent individual characters as vectors, subword embeddings that may represent subwords (parts of words) as vectors, and/or other techniques. Pre-trained models may include one or more of Bidirectional Encoder Representations from Transformers (BERT), Robustly Optimized BERT Approach (ROBERTa), XLNet, and/or other embedding techniques.

In some implementations, model component 111 may be configured to store a model in the non-transitory electronic storage 128 and/or other storage locations.

In some implementations, model component 111 may be configured to access one or more models through a distributed network of models. Accessing a model may refer to a process of interacting with a model and/or utilizing a model's capabilities remotely through a network connection. There are several ways to access model(s) in a distributed network, including one or more of API Calls (e.g., send requests to a server hosting a model, and receive responses through APIs), Remote Procedure Calls (RPC) (e.g., invoking model methods or functions remotely, as if the model were a local application), Message Passing (e.g., send messages to a server hosting a model, and receive responses through message queues or brokers), and/or other methods for providing prompts, receiving inferences, and/or otherwise communicating with one or more models.

Distributed networks of models may refer to a design where multiple models are trained and/or deployed across a network of devices, or "nodes," working together to achieve a common goal. Distributed networks provide many advantages. These include, among other, scalability to handle larger datasets and more complex models by distributing the computational workload, flexibility by allowing for the integration of different models and architectures, ability to continue functioning even if some nodes fail, leveraging diverse sets of information and models to enhance overall performance and/or generalization, reducing the risk of a single point of failure, and/or speeding up training times by parallelizing computations across nodes. Some examples of distributed networks include PyTorch Distributed, TensorFlow Distributed, Apache MXNet, and Hugging Face Transformers.

With respect to training, a distributed network may split training information across multiple nodes, where each node may train a replica of a given model. Nodes may train locally and share model updates with a central server. In some implementations, a model may be split across multiple nodes, and each node may train a portion of the model. In some implementations, nodes may share relevant information, reducing communication overhead.

When generating interferences, input may be split across multiple nodes, and individual nodes may generate inferences on its portion. In some implementations, a model may be split into stages across nodes, and individual nodes may individually perform one or more stages in the process of generating an inference. By way of non-limiting illustration, a retrieval step may be performed at one node, an augmentation step may be performed at another node, and a generation step may be performed at yet another node.

In some implementations, as part of training of a machine learning model and preparing model training information, transaction component 108 may be configured to obtain transaction information characterizing a set of transactions. By way of non-limiting illustration, the transaction information may include first transaction information which characterizes a first transaction and/or other transactions.

In some implementations, classification component 109 may be configured to obtain classification information identifying known contract classes of the transactions in the set of transactions. Individual transactions may be classified in individual contract classes. By way of non-limiting illustration, the classification information may include first classification information which identifies a first contract class for the first transaction. In some implementations, classification information obtained and used for training may leverage an existing dataset of known and/or verified contracts. By way of non-limiting illustration, one or more public resources may provide access to the code of known smart contracts, in the hundreds of thousands.

The model component 111 may be configured to generate model training information. The model training information may include one or more of transaction information, classification information, and/or other information. The model training component 111 may be configured to aggregate one or more of transaction information, classification information, and/or other information into the model training information. The model training information may be information suitable for training a machine learning model for the purposes described herein (e.g., may be a vector space representation). By way of non-limiting illustration, the model component 111 may be configured to provide the model training information and/or other information to a machine learning model to train the machine learning model. Training the machine learning model may generate a trained machine learning model. The trained machine learning model may be configured to generate output comprising contract classes of new transactions, and/or other information. "New" transactions may refer to transactions newly recorded to the transaction log 150 after the model has been trained and/or transactions that existed prior to the training but not used as part of the training (e.g., not included in the set of transaction).

In some implementations, the transaction information included in the model training information may include one or more transaction feature values of one or more transaction features of the transactions in the set of transaction used for training purposes. In particular, aggregating transaction information and classification information into the model training information may include generating correspondence information and/or other information. The model training information may include the correspondence information. The correspondence information may define correspondences between transaction feature values of the transactions in the set of transactions and the known contract classes of the transactions. In other words, the correspondence information may form a robust set of labeled training data, e.g., where sets of transaction feature values from the set of transactions may be labeled with corresponding contract classes.

By way of non-limiting illustration, correspondence information may include one or more of a first correspondence between a first set of transaction feature values of a first set of the transactions and the exchange contract class, a second correspondence between a second set of transaction feature values of a second set of the transactions and the liquidity contract class, a third correspondence between a third set of transaction feature values of a third set of the transactions and the bridge contract class, a fourth correspondence between a fourth set of transaction feature values of a fourth set of the transactions and the gambling contract class, a fifth correspondence between a fifth set of transaction feature values of a fifth set of the transactions and the stake contract class, a sixth correspondence between a sixth set of transaction feature values of a sixth set of the transactions and the proxy contract class, a seventh correspondence between a seventh set of transaction feature values of a seventh set of the transactions and the initial offering contract class, an eighth correspondence between an eighth set of transaction feature values of an eighth set of the transactions and the factory contract class, and/or other correspondences.

The first set of transaction feature values corresponding to the exchange contract class may include one or more of swap functions, relatively high frequency of value transfers, pairs of values being exchanged, exchanged-based fees, and/or other feature values.

The second set of transaction feature values corresponding to the liquidity contract class may include one or more of liquidity functions, locked value, liquidity-specific value, and/or other feature values.

The third set of transaction feature values corresponding to the bridge contract class may include one or more of bridge functions, identification of source and destination networks, bridge-specific value, and/or other feature values.

The fourth set of transaction feature values corresponding to the gambling contract class may include one or more of gambling functions, randomness sources, payout structures, and/or other feature values.

The fifth set of transaction feature values corresponding to the stake contract class may include one or more of staking functions, staking durations, staking amounts, reward mechanisms, and/or other feature values.

The sixth set of transaction feature values corresponding to the proxy contract class may include one or more of delegation functions, minimal logic function, upgrade histories, and/or other feature values.

The seventh set of transaction feature values corresponding to the initial offering contract class may include one or more of sale functions, sale caps, contribution limits, vesting schedules, and/or other feature values.

The eighth set of transaction feature values corresponding to the factory contract class may include one or more of deployment functions, identification of other contracts deployed, and/or other feature values.

In some implementations, generating correspondence information may be accomplished through manual labeling and/or one or more automated labeling techniques. In some implementations, users may manually verify a representative sample of an output of automated labeling to ensure accuracy.

The model component 111 may be configured to provide the model training information and/or other information to a model to train, retrain, refine, and/or adapt the model. By virtue of current technology surrounding machine learning, the act of providing the model training information to a model may cause the model to be trained to thereby generate a trained model.

One or more models used by system 100 may be continually refined as time goes on. By way of non-limiting illustration, transaction information, correspondence information, and/or other information may be continuously updated as smart contracts are deployed, transactions are recorded, and/or users interact with transactions in transaction log 150. Updated information may be provided back into the trained model to further refine and/or retrain it.

In some implementations, a model may be continually refined for specific contract classes. By way of non-limiting illustration, as more public information is made available about known smart contracts, additional examples of contract classes and labeled transaction feature values may be provided for further fine tuning. Further, in some implementations, users may manually verify and/or correct output of the trained machine learning model, which may act as another mechanism to refine the model.

Model Utilization and Classification

Referring now to the utilization of a trained machine learning model, the transaction component 108 may be configured to obtain transaction information characterizing new transactions recorded on transaction log 150 stored in immutable distributed electronic storage 140. By way of non-limiting illustration, the transaction information may include first new transaction information which characterizes a second transaction. The second transaction may identify an address and/or other addresses. The first new transaction information may include a set of transaction features values for transaction features of the second transaction, and/or other information.

The model component 111 may be configured to provide the transaction information characterizing individual ones of the new transactions as input into a trained machine learning model. By way of non-limiting illustration, the first new transaction information and/or other information for other transactions may be provided as input into the trained machine learning model.

The classification component 109 may be configured to obtain the output from the trained machine learning model and/or perform other operations.

The classification component 109 may be configured to generate, from the output and/or other information, new classification information. The new classification information may include one or more of new transaction classification information, new address classification information, and/or other information. The new transaction classification information may include the contract classes of the new transactions and/or other classifications. By way of non-limiting illustration, the new classification information may include first new classification information which identifies the first contract class of the second transaction based on the output of the trained machine learning model.

The classification component 109 may be configured to generate the new address classification information specifying contract classes of address identified in the new transactions. The addresses may be classified in individual contract classes of the individual transactions in which they are identified. The addresses may be classified in individual contract classes in other ways. By way of non-limiting illustration, the first new classification information may include first new classification information which identifies the first contract class for the first address by virtue of the first contract class of the second transaction.

In some implementations, second new transaction information may characterize a third transaction. The third transaction may identify a second address and/or other address. The second new transaction information may be provided as input into the trained machine learning model. Second new classification information may be generated from the output of the trained machine learning model. The second new classification information may include one or more of identification of a second contract class of the third transaction, identification of the second contract class of the second address, and/or other information.

It is noted that while the machine learning model is described herein as providing a basis for classification into contract classes, it is to be understood that other transaction classes (e.g., non-smart contract classes) and/or address classes may also be determined using on the model, and/or through other techniques.

By way of non-limiting illustration, individual transaction classes of individual transactions may be determined from individual sets of transaction information characterizing one or more transactions, and/or other information. An individual set of transaction information characterizing one or more transactions may be indicative of an individual transaction class of an individual transaction. In some implementations, transaction classes may or may not be explicitly recorded as a distinct attribute in a transaction record. In some implementations, the class of a transaction may be inferred from information recorded on a transaction record and/or information derived from a transaction record.

In some implementations, classification component 109 may utilize and/or reference transaction-class mapping information (stored in electronic storage 128 and/or other storage location) including individual mappings between individual sets of transaction information and individual transaction classes. By way of non-limiting illustration, transaction-class mapping information may include one or more of a mapping between a set of transaction information and the transfer class of transactions, a mapping between a set of transaction information and the swap class of transactions, a mapping between a set of transaction information and the stake class of transactions, a mapping between a set of transaction information and the fee class of transactions, a mapping between a set of transaction information and the creation class of transactions, and/or other mappings. By way of non-limiting illustration, transaction information indicative of the transfer class may have a basic structure of moving value from one address to another. By way of non-limiting illustration, transfer class transactions may be recorded as a transfer of value of a given type from one address to another.

In some implementations, individual address classes of individual addresses may be determined from individual sets of transaction information characterizing one or more transactions involving the individual addresses, and/or other information. An individual set of transaction information characterizing one or more transactions may be indicative of an individual address class of an individual address. In some implementations, a set of transaction information characterizing one or more transactions involving an individual address may indicate a behavior of the individual address over the one or more transactions. The behavior and/or other information may provide insight into the address class of the address.

By way of non-limiting illustration, to classify an individual address, classification component 109 may obtain transaction information characterizing one or more transactions involving the individual address. In some implementations, address classes may or may not be explicitly recorded as a distinct attribute of a given transaction record. In some implementations, the class of an address may be inferred from information recorded on one or more transaction records and/or information derived from the one or more transaction records. That is, a transaction log 150 may or may not directly encode or label the class of an address in recorded information, but instead may be inferred based on one or more of behavior, transaction patterns, known roles, and/or other information.

In some implementations, classification component 109 may utilize and/or reference address-class mapping information (stored in electronic storage 128 and/or other storage location) including individual mappings between individual sets of transaction information and individual address classes. By way of non-limiting illustration, address-class mapping information may include one or more of a mapping between a set of transaction information and a wallet class of address, a mapping between a set of transaction information and a contract class of address, a mapping between a set of transaction information and a validator class of address, a mapping between a set of transaction information and a stake class of address, a mapping between a set of transaction information and a bridge class of address, and/or mappings. By way of non-limiting illustration, transaction information indicative of the wallet class may include one or more of frequency of transactions, amount of transactions, amount of value transferred per transaction, and/or other information. By way of non-limiting illustration, transfers involving digital wallets may generally have varied activity patterns, such as occasional transactions and/or personal (e.g., relatively low value) spending. The transactions from wallet addresses may be often less frequent compared to exchanges, smart contracts, and/or other addresses. Wallet addresses may not follow predictable patterns, and/or may interact with other addresses in a specific way.

Graphical Representations

In some implementations, user interface component 110 may be configured to manage information defining a graph and/or individual portions of the graph through which the transactions are visually represented. The graph and/or individual portions of the graph may provide visualizations of transactions. Managing information may include one or more of determining, obtaining, receiving, requesting, checking, storing, modifying, and/or other operations. Managing information defining a graph and/or individual portions of the graph may include generating user interface information and/or other processes.

The user interface component 110 may be configured to effectuate presentation of instances of a graphical user interface on client computing platform(s) 104 of the users. The user interface may provide one or more views of a graph and/or individual graph portions, and/or provide other features and/or functionality. In some implementations, an individual view may include textual and/or graphical displays. The user interface may include one or more user interface elements configured to facilitate user interaction with the user interface. By way of non-limiting illustration, user interface elements may include one or more of text input fields, drop-down menus, check boxes, display windows, selectable user interface elements (e.g., virtual buttons, icons, and/or other elements), graphics, panes, and/or other elements.

Effectuating presentation of a graphical user interface may include one or more of generating user interface information defining the user interface, communicating the user interface information to client computing platform(s) 104 over network(s) 116, and/or other operations. Individual client computing platform(s) 104 may receive the user interface information and/or other information. Receipt of the user interface information may cause the client computing platform(s) 104 to present instances of the user interface.

The user interface component 110 may be configured to establish one or more network connections between server(s) 102 and client computing platform(s) 104 associated with users.

The user interface component 110 may be configured to generate user interface information defining instances of a graphical user interface through which the transactions are represented as a graph and/or in other ways. By way of non-limiting illustration, the graphical user interface may display, within a field of two or more dimensions, at least a graph portion of the graph. The graph may be comprised of one or more of graph nodes, graph edges between graph nodes, and/or other content.

The graph nodes within the graph may represent the addresses. Individual graph nodes may be presented within individual visual characteristics assigned to the individual addresses based on individual address classifications. In some implementations, a graph node may have one or more particularly assigned visual characteristic in order to visually convey an address class and/or a contract subclass. That is, an individual graph node representing an address that has an address classification and an additional (and/or inherent) contract classification may include a visual characteristic that represents the address class, and another visual characteristic that represents on the contract class.

The graph edges between the graph nodes may represent transaction flow. The individual graph edges may be presented within individual visual characteristics assigned to the individual transactions based on individual transaction classifications.

In some implementations, the user interface component 110 may be configured to assign one or more visual characteristic to individual addresses and/or individual transaction. In some implementations, the user interface component 110 may be configured to obtain individual visual characteristic assignments previously assigned to individual addresses and/or individual transactions. In some implementations, assignment of an individual visual characteristic may generate an association with the individual visual characteristic so that presentation of a graph node representing an address and/or graph edge representing a transaction flow, as the case may be, may lead to presentation of the graph node and/or graph edge with an associated individual visual characteristic.

Visual characteristics may include one or more of shape, size, color, fill pattern, and/or other visual characteristics. By way of non-limiting illustration, shapes may include one or more of circle, square, diamond, triangle, octagon, line, arrowhead, and/or other shapes. In some implementations, size may be a relative characteristic. A fill pattern may include a line pattern and/or other pattern that fills in a given shape, e.g., is within an outline of a shape. By way of non-limiting illustration, fill patterns may include one or more of hash marks, dots, horizontal lines, vertical lines, diagonal lines, and/or other patterns.

By way of non-limiting illustration, a graph node may comprise a circle shape having a diameter of one unit of measurement, while another graph node may comprise a circle shape having a diameter of two units of measurement.

In some implementations, lines may be visually distinguished by line types. An individual line type may have a unique and distinguishable visualization. By way of non-limiting illustration, line types may include one or more of a thin line, a thick line, a double line, a dotted line, a triple line, a jagged line, and/or other line types.

By way of non-limiting illustration, a visual characteristic of a graph edge may include a line shape having an arrow pointing in a direction of a transaction flow (e.g., from sender/source graph node to recipient/destination graph node). The user interface component 110 may be configured to cause the graph nodes to be displayed with visual characteristics assigned to addresses, and the graph edges to be displayed with visual characteristics assigned to transactions.

The user interface component 110 may be configured to assign one or more visual characteristics to individual addresses based on the individual address classes and/or other information. In some implementations, addresses of the same address class may be assigned the same one or more visual characteristics. The same visual characteristic(s) assigned to addresses of the same class may be one or more of shape, color, and/or other visual characteristics. Accordingly, one or more visual characteristics may provide an immediate visual differentiation between addresses of different address classes and/or transactions of different transaction classes.

By way of non-limiting illustration, a wallet class may be associated with a first shape and/or other visual characteristic, a validator class may be associated with a second shape and/or other visual characteristic, a stake class may be associated with a third shape and/or other visual characteristic, a bridge class may be associated with a fourth shape and/or other visual characteristic, an exchange class may be associated with a fifth shape and/or other visual characteristic, a contract class may be associated with an sixth shape and/or other visual characteristic, and/or other address classes may be associated with other shapes.

The user interface component 110 may be configured to assign one or more visual characteristics to individual transactions based on the individual transaction classes and/or other information. In some implementations, transactions of the same transaction class may be assigned the same one or more visual characteristics. The same visual characteristic(s) assigned to transactions of the same class may be line type, color, and/or other visual characteristics.

By way of non-limiting illustration, transfer class may be associated with a first line type and/or other visual characteristic, swap class may be associated with a second line type and/or other visual characteristic, stake class may be associated with a third line type and/or other visual characteristic, fee class may be associated with a fourth line type and/or other visual characteristic, creation class may be associated with a fifth line type and/or other visual characteristic, an contract class may be associated with a sixth line type and/or other visual characteristic, and/or other transaction classes may be associated with other visual characteristics.

By way of non-limiting illustration, the first address may be assigned a first visual characteristic based on classification in the first contract class, and the second address may be assigned a second visual characteristic based on classification in the second contract class. In some implementations, the first visual characteristic may be a first shape and the second visual characteristic may be a second shape. In some implementations, the first visual characteristic may be a first color and the second visual characteristic may be a second color. In some implementations, the first visual characteristic may be a fill pattern, and the second visual characteristic may be a shape.

In some implementations, the graphical user interface may include one or more portions. The portions may include one or more of a graph display portion that displays a graph and/or individual graph portions of the graph, an on-demand display portion, a table display portion that displays text representations of a transaction, and/or other portions.

An on-demand display portion may be configured to display one or more of address-specific information, transaction flow-specific information, and/or other information. The on-demand display portion may present information in response to user input requesting display within that portion. By way of non-limiting illustration, individual graph nodes and/or individual graph edges may comprise selectable user interface elements. Selection of an individual graph node (representing an individual address) and/or an individual graph edge (representing an individual transaction flow) may cause corresponding address-specific information (specific to the individual address) and/or transaction-flow specific information (specific to the individual transaction flow) to be presented within the on-demand display portion.

The address-specific information, transaction flow-specific information, and/or other information presented within on-demand display portion may include information from transaction information obtained by transaction component 108, and/or information obtained from one or more other information sources.

By way of non-limiting illustration, address-specific information associated with an individual address may include one or more of an amount of value associated with the individual address (e.g., the individual address's balance), a date when the individual address was created, identification of one or more other addresses associated with the individual address, identification of one or more address classes of the individual address, smart contract code associated with an address, and/or other information.

By way of non-limiting illustration, transaction flow-specific information associated with an individual transaction flow of an individual transaction may include one or more of identification of addresses associated with the individual transaction, indication of individual addresses as sender and/or recipient, a characterization of value transferred in the individual transaction, a fee associated with the individual transaction, timestamp for when the individual transaction was requested and/or executed, identification of one or more transaction classes of the individual transaction, smart contract code associated with an transaction, and/or other information. In some implementations, value transferred in the individual transaction may be characterized by one or more of value type, amount, and/or other characterizations.

In some implementations, a display of a graph and/or graph portion may be characterized by one or more of an address-centric display, a transaction-centric display, a cross-network display, and/or other characteristics. An address-centric display may include a display which emphasizes and/or otherwise makes prominent one or more addresses. Emphasizing and/or making prominent may include, for example, positioning a graph node in a centered position (or substantially centered position) within the user interface so as to draw a user's attention to the graph node as a principal reason for the display. A transaction-centric display may include a display which emphasizes and/or otherwise makes prominent a transaction (and/or transaction flow). Emphasizing and/or making prominent may include, for example, positioning a graph edge in a centered position (or substantially centered position) within the user interface so as to draw a user's attention to the graph edge as a principal reason for the display.

In some implementations, a cross-network display may correspond to a configuration of a graph display portion of a user interface that is specific to presenting transaction(s) involving more than one network (and/or more than one transaction log). Such transactions may include one or more of swap transactions, smart contract transactions, transactions involving bridge class address(es), and/or other transactions. A cross-network display may include one or more visual characteristics to visually differentiate between different networks involved in a transfer of value (e.g., movement of value from one transaction log to another). In some implementations, visual characteristic(s) that visually differentiate between different networks may include one or more of a demarcation line, color contrast, and/or other visual characteristics.

By way of non-limiting illustration, a demarcation line may be provided in a graph display portion to differentiate between addresses that are part of different networks. A demarcation line may be centered within the graph display portion and/or positioned in other ways. A graph node representing an address of one network may be positioned on one side of a demarcation line, and a graph node representing an address of another network may be positioned on another side of the demarcation line. In some implementations, a graph edge presenting a transaction flow may cross a demarcation line, indicating a transfer between networks. For bridge class address(es), a graph node representing a bridge class address may be positioned on the demarcation line (e.g., straddling the line). In some implementations, multiple demarcation lines may be provided to differentiate between additional networks. By way of non-limiting illustration, a graph display portion may be divided into two or more sections using one or more demarcation lines.

By way of non-limiting illustration, color contrast may be provided in a graph display portion to differentiate between addresses that are part of different networks. The graph display portion may be divided into two or more sections, with individual sections having an individual color, and with different colors representing different networks. A graph node representing an address of one network may be positioned in a section of a given color, another graph node representing another address of another network may be positioned in a section of another given color, etc. In some implementations, a graph edge presenting a transaction flow may extend between an intersection of colors, indicating a transfer between networks. A graph node representing a bridge class address may be positioned at an intersection of two or more colors (e.g., straddling the intersection).

The user interface component 110 may be configured to effectuate communication of the user interface information to client computing platform(s) 104 associated with the user(s) to cause client computing platform(s) 104 to present instance(s) of the graphical user interface.

By way of non-limiting illustration, user interface information may define a first instance of the graphical user interface through which the second transaction is represented in a first graph portion of the graph. The first instance of the graphical user interface may display a first graph node representing the first address and/or other graph content. The user interface information defining the first instance of the graphical user interface may be communicated to a first remotely located client computing platform over a first network connection to cause the first remotely located client computing platform to display the first graph portion including the first graph node presented with the first visual characteristic assigned thereto.

Based on the features and/or functions herein, an improved user interface is provided, which makes information underlying a transaction log more understandable through specialized visualization driven by sophisticated machine learning. One or more implementations of the user interface may eliminate the need to decipher complex strings of characters and/or smart contract code to gain insights. Different classes of transactions may be represented differently so as to visually distinguish between the different classes of transactions. Different classes of addresses may be represented differently so as to visually distinguish between the different classes of addresses. Addresses and/or transactions may be presented predominately within a display to draw focus to a user's search and the insights they wish to gain. Other features and/or functions described herein may also contribute to improvements intended by the inventor(s) and/or improvements that may become apparent to a person having ordinary skill in the art.

In some implementations, instances of the user interface may be configured to receive user input at the client computing platform(s) 104. The user input may include one or more of selection of individual user interface elements, text entry, and/or other input. By way of non-limiting illustration, individual graph nodes, individual graph edges, and/or other content of user interface may be selectable to effectuate one or more actions.

The user interface component 110 may be configured to obtain and/or generate user input information conveying user input within the instances of the user interface at the client computing platform(s) 104. By way of non-limiting illustration, the user input information may convey user input including selection of individual graph nodes, selection of the individual graph edges, selection from drop-down menus, selection of virtual buttons or icons, and/or other selection of other user-selectable content displayed in the instances of the graphical user interface.

In some implementations, the user input information may be stored in non-transitory electronic storage 128 and/or other storage locations. In some implementations, interactions at the client computing platform(s) 104 comprising user input may be communicated to user interface component 110 such that user interface component 110 may generate the user input information. In some implementations, individual client computing platforms may generate the user input information based on the user entry and/or selection at the client computing platform(s) 104 and communicate the user input information to the user interface component 110.

The user interface component 110 may be configured to, responsive to obtaining user input information, cause the instances of the graphical user interface to display one or more of address-specific information, transaction flow-specific information, and/or other information. The user interface component 110 may be configured to, responsive to obtaining user input information, perform one or more other actions. The one or more other actions may include, for example, one or more of displaying a pop-up window, displaying a drop-down menu, navigating to another view, and/or other actions.

In some implementations, a user interface may include one or more user interface elements through which users submit search terms and/or queries. Submission may be accomplished through one or more of text input, selection of a check box, and/or other interactions. By way of non-limiting illustration, the user interface may include a user interface element comprising a text input box through which users submit search terms and/or queries.

In some implementations, a search term and/or query may include one or more of a part or a whole of an address's identification (e.g., a unique identifier such as a string of alphanumeric character), a part or a whole of a transaction's identification (e.g., a unique identifier such as a string of alphanumeric character), and/or other information.

The query component 112 may be configured to obtain user-submitted search terms and/or queries input through instances of the user interface. The query component 112 may be configured to access the transaction log 150 and/or other storage location (e.g., other transaction logs). The query component 112 may be configured to access the transaction log 150 through one or more of an Application Programming Interface (API) providing direct access to the transaction log 150 through one or more nodes, SQL database, and/or by other mechanisms. The query component 112 may be configured to indirectly access the transaction log 150 by accessing a web service that has access to the transaction log 150. By way of non-limiting illustration, a web service may compile and/or format information recorded on transaction log 150 into a searchable format.

The query component 112 may be configured to search the transaction log 150 (directly and/or indirectly) based on the user-submitted search terms and/or queries. The query component 112 may be configured to identify transaction(s) recorded on the transaction log 150 that match and/or are matched with the user-submitted search terms and/or queries. Responsive to query component 112 identifying transaction(s) recorded on the transaction log 150 that match and/or are matched with the user-submitted search terms and/or queries, transaction component 108 may be configured to obtain transaction information and/or other information.

Figure 3:
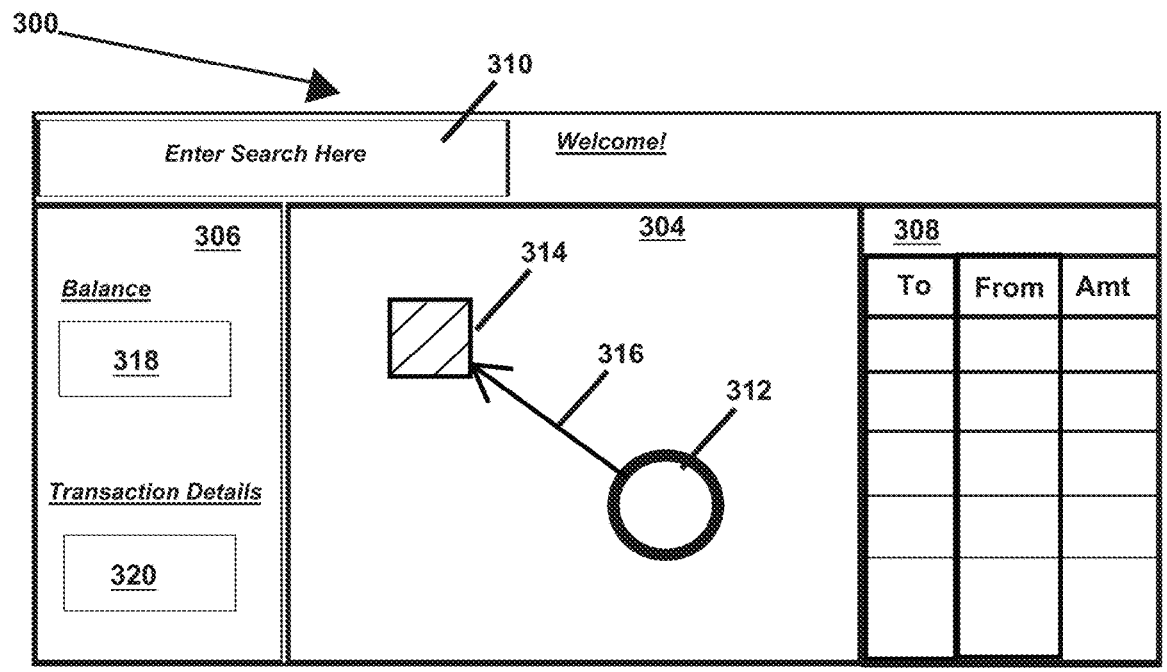
FIG. 3 illustrates a user interface, in accordance with one or more implementations.

FIG. 3 illustrates a user interface 300, in accordance with one or more implementations. The user interface 300 may display one or more of a graph display portion 304 that displays the at least a graph portion of a graph, an on-demand display portion 306 that displays text such as address-specific information and/or transaction flow-specific information, a table display portion 308 that displays text representations of a transaction, and/or other content.

Users may initiate presentations within user interface 300 by submitting queries. Submission may be accomplished, for example, by providing input into a search field 310. The search field 310 may comprise, for example, a text input box.

As used herein, the graph display portion 304 may display one or more of graph nodes representing addresses, graph edges between the graph nodes representing transaction flow between the addresses, and/or other content. By way of non-limiting illustration, in response to a search query and identification of a first transaction, transaction information for the first transaction may be obtained, and may provide a basis from which visualizations within graph display portion 304 are generated. By way of non-limiting illustration, graph display portion 304 may display one or more of a first graph node 312 representing a first address, a second graph node 314 representing a second address, and a first graph edge 316 representing a first transaction flow between the first address and the second address in accordance with the first transaction. The first graph node 312 and/or second graph node 314 may have one or more visual characteristics. By way of non-limiting illustration, first graph node 312 may have a graph node shape, such as a circle, which is representative of an address class of the first address.

By way of non-limiting illustration, second graph node 314 may have a graph node shape, such as a square, which may be representative of an address class of the second address. By way of non-limiting illustration, second graph node 314 may have fill pattern, such as diagonal lines, which may be representative of a contract class of the second address.

The first graph edge 316 may have one or more visual characteristics. By way of non-limiting illustration, first graph edge 316 may have an arrowhead pointing in the direction of a transaction flow (e.g., from the first graph node 312 to the second graph node 314). The first graph edge 316 may have a visual characteristic based on a transaction class of the first transaction. By way of non-limiting illustration, first graph edge 316 may have a single line type line visual characteristics which may be representative of the transaction class of the first transaction.

In a scenario where the search query returns an identification of the first transaction, the user interface 300 may display the graph portion within the graph display portion 304 as a transaction-centric display. By way of non-limiting illustration, the first graph edge 316 may be displayed relatively centered within graph display portion 304 and/or presented in other ways that makes the first graph edge 316 more prominent that other elements in graph display portion 304.

In some implementations, in response to user input including selection of the first graph node 312, the user interface 300 may display first information specific to the first address within on-demand display portion 306 (e.g., within sub-portion 318). The first information may include one or more of an amount of value associated with the first address, an address class of the first address, and/or other information. In some implementations, in response to input including selection of the second graph node 314, the user interface 300 may display second information specific to the second address within on-demand display portion 306 (e.g., within sub-portion 318). The second information may include one or more of an amount of value associated with the second address, an address class of the second address, a contract class of the second address, information about a smart contract associated with the second address, and/or other information. In some implementations, in response to user input including selection of the first graph edge 316, the user interface 300 may display third information specific to the first transaction flow within on-demand display portion 306 (e.g., within sub-portion 320). The third information may include one or more of an indication of the first address as a sender, an indication of the second address as a recipient, a characterization of value transferred in the first transaction, a fee associated with the first transaction, a timestamp for when the first transaction was executed, a transaction class of the first transaction, a description of a smart contract involved, and/or other information.

The table display portion 308 may display text representations of transactions. Such displays may represent a typical form of presentation of information characterizing transactions recorded on a transaction log. By way of non-limiting illustration, the table display portion 308 may include a grid of cells arranged in attribute-name columns and rows of cells including text corresponding attributes names in the attribute-named columns. The attributes may include one or more of a timestamp, a sender, a recipient, an amount of value transferred, and/or other attributes.

Figure 4:
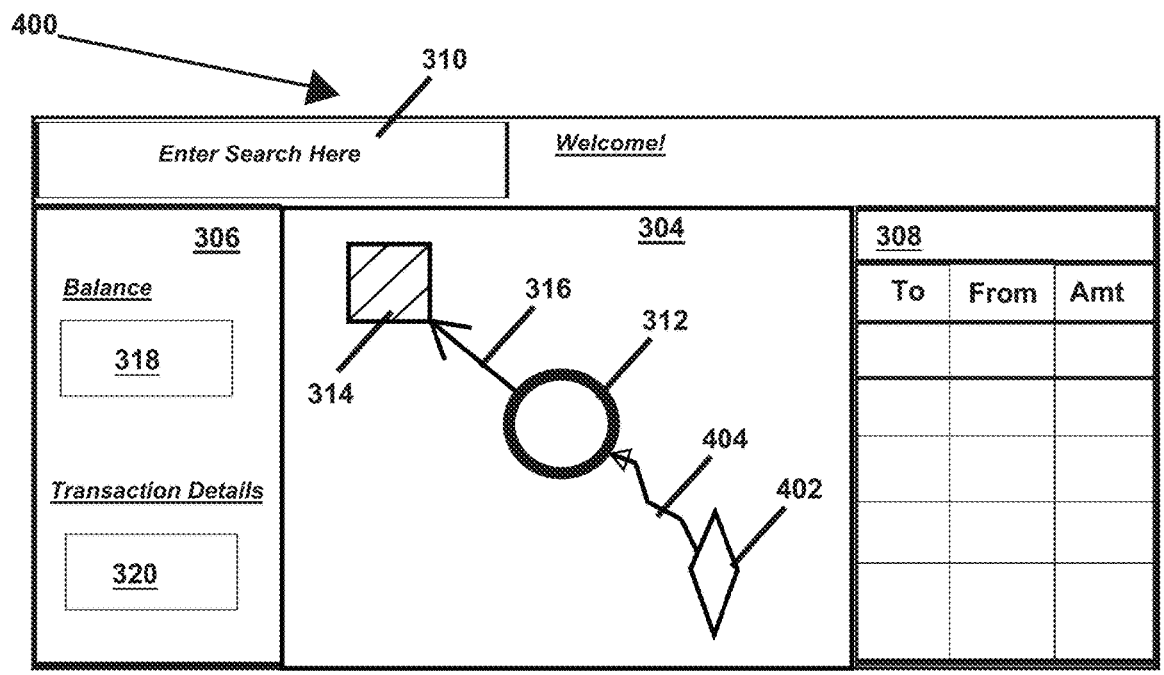
FIG. 4 illustrates a user interface, in accordance with one or more implementations.

FIG. 4 illustrates a user interface 400, in accordance with one or more implementations. The user interface 400 may include similar elements as user interface 300 of FIG. 3, with like reference numerals referring to like elements.

In some implementations, user interface 400 may be presented as a result of a search query that identifies the first address (as opposed to the first transaction in FIG. 3). In some implementations, user interface 400 may be presented as a result of further user input into FIG. 3. By way of non-limiting illustration, a user may provide further input with respect to the first graph node 312. Such further input may include, for example, selecting the first graph node 312 to cause a drop-down menu to be displayed, and selecting an option to view a graph portion of the graph with the first address being prominent. This may return a presentation that graphically represents one or more transactions involving the first address.

By way of non-limiting illustration, in response to identification of the first address, graph display portion 304 may display one or more of the first graph node 312 representing the first address, the second graph node 314 representing the second address, the first graph edge 316 representing a first transaction flow between the first address and the second address in accordance with the first transaction, a third graph node 402 representing a third address, and a second graph edge 404 representing a second transaction flow between the first address and the third address in accordance with the second transaction.

In some implementations, third graph node 402 may have a graph node shape, such as a diamond, which may be representative of an address and/or contract class of the third address. The second graph edge 404 may have one or more visual characteristics. By way of non-limiting illustration, second graph edge 404 may have an arrowhead pointing in the direction of a transaction flow (e.g., from the third graph node 402 to the first graph node 312). The second graph edge 404 may have a visual characteristic based on a transaction class of the second transaction. By way of non-limiting illustration, second graph edge 404 may have a jagged line type line visual characteristic which may be representative of the transaction class of the second transaction.

In a scenario where the search query returns an identification of the first address (e.g., based on a result of the search query and/or further user input into FIG. 3), the user interface 300 may display the graph portion within the graph display portion 304 as an address-centric display. By way of non-limiting illustration, the first graph node 312 may be displayed relatively centered within graph display portion 304 and/or presented in other ways that makes the first graph node 312 more prominent that other elements in graph display portion 304.

It is to be appreciated that the depictions and corresponding descriptions for FIGS. 3-4 are for illustrative purposes only and are not to be considered limiting. Instead, they are illustrative of different ways transactions recorded on immutable distributed electronic storage media may be graphically represented in accordance with this disclosure.

Referring back to FIG. 1, in some implementations, server(s) 102, client computing platform(s) 104, electronic storage media 140, and/or external resources 126 may be operatively linked via one or more electronic communication links. For example, such electronic communication links may be established, at least in part, via network(s) 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform (s) 104. By way of non-limiting example, a given client computing platform may include one or more of a desktop computer, a laptop computer, a handheld computer, a tablet computing platform, a NetBook, a Smartphone, a gaming console, and/or other computing platforms.

Server(s) 102 may include electronic storage 128, one or more processors 130, and/or other components. Server(s) 102 may include communication lines, or ports to enable the exchange of information with network(s) 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 109, 110, 111, 112, and/or other components. Processor(s) 130 may be configured to execute components 108, 109, 110, 111, 112, and/or other components by software; hardware; firmware; some combination of software, hardware, and/or firmware; and/or other mechanisms for configuring processing capabilities on processor(s) 130. As used herein, the term "component" may refer to a component or set of components that perform the functionality attributed to the component. This may include one or more physical processors during execution of processor readable instructions, the processor readable instructions, circuitry, hardware, storage media, or any other components.

It should be appreciated that although components 108, 109, 110, 111, and/or 112 are illustrated in FIG. 1 as being implemented within a single processing unit, in implementations in which processor(s) 130 include multiple processing units, one or more of components 108, 109, 110, 111, and/or 112 may be implemented remotely from the other components. The description of the functionality provided by the different components 108, 109, 110, 111, and/or 112 described below is for illustrative purposes, and is not intended to be limiting, as any of components 108, 109, 110, 111, and/or 112 may provide more or less functionality than is described. For example, one or more of components 108, 109, 110, 111, and/or 112 may be eliminated, and some or all of its functionality may be provided by other ones of components 108, 109, 110, 111, and/or 112. As another example, processor(s) 130 may be configured to execute one or more additional components that may perform some or all of the functionality attributed below to one of components 108, 109, 110, 111, and/or 112.

Figure 2A:
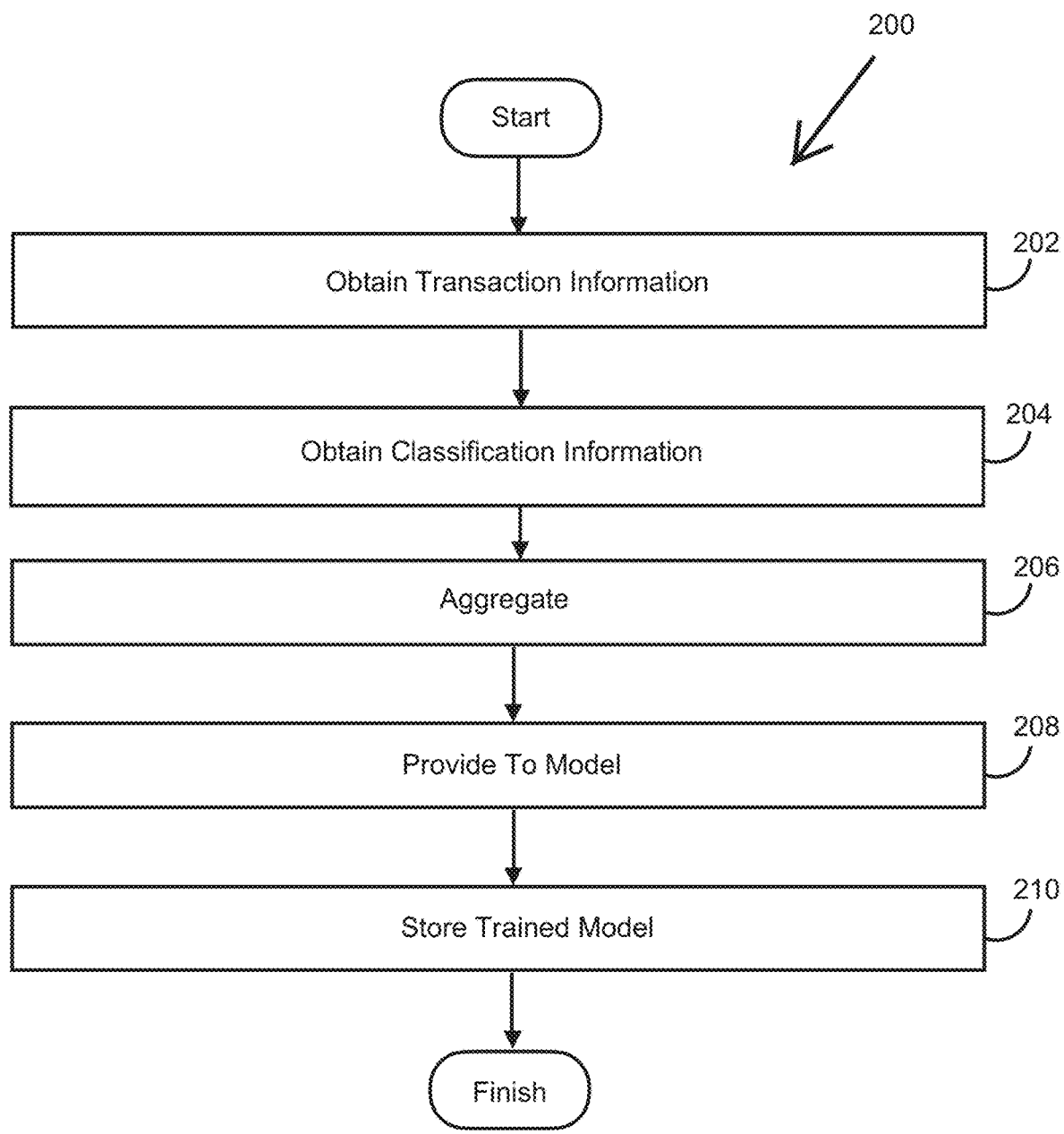
FIG. 2a illustrates a method to train a machine learning model, in accordance with one or more implementations.

FIG. 2a illustrates method 200 to train a machine learning model, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2a and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may obtain transaction information characterizing transactions recorded on a transaction log stored in immutable distributed electronic storage. The transaction information may include first transaction information which characterizes a first transaction. Operation 202 may be performed by one or more hardware processors configured by machine-readable instructions including a component that is the same as or similar to transaction component 108 (shown in FIG. 1 and described herein), in accordance with one or more implementations.

An operation 204 may obtain classification information identifying contract classes of the transactions. Individual transactions may be classified in individual contract classes. The classification information may include first classification information which identifies a first contract class for the first transaction. Operation 204 may be performed by one or more hardware processors configured by machine-readable instructions including a component that is the same as or similar to classification component 109 (shown in FIG. 1 and described herein), in accordance with one or more implementations.

An operation 206 may aggregate the transaction information and the classification information into model training information. Operation 206 may be performed by one or more hardware processors configured by machine-readable instructions including a component that is the same as or similar to model component 111 (shown in FIG. 1 and described herein), in accordance with one or more implementations.

An operation 208 may provide the model training information to a machine learning model to train the machine learning model. Training the machine learning model may generate a trained machine learning model. The trained machine learning model being trained to generate output comprising the contract classes of new transactions. Operation 208 may be performed by one or more hardware processors configured by machine-readable instructions including a component that is the same as or similar to model component 111 (shown in FIG. 1 and described herein), in accordance with one or more implementations.

An operation 210 may effectuate storage of the trained machine learning model. Operation 210 may be performed by one or more hardware processors configured by machine-readable instructions including a component that is the same as or similar to model component 111 (shown in FIG. 1 and described herein), in accordance with one or more implementations.

Figure 2B:
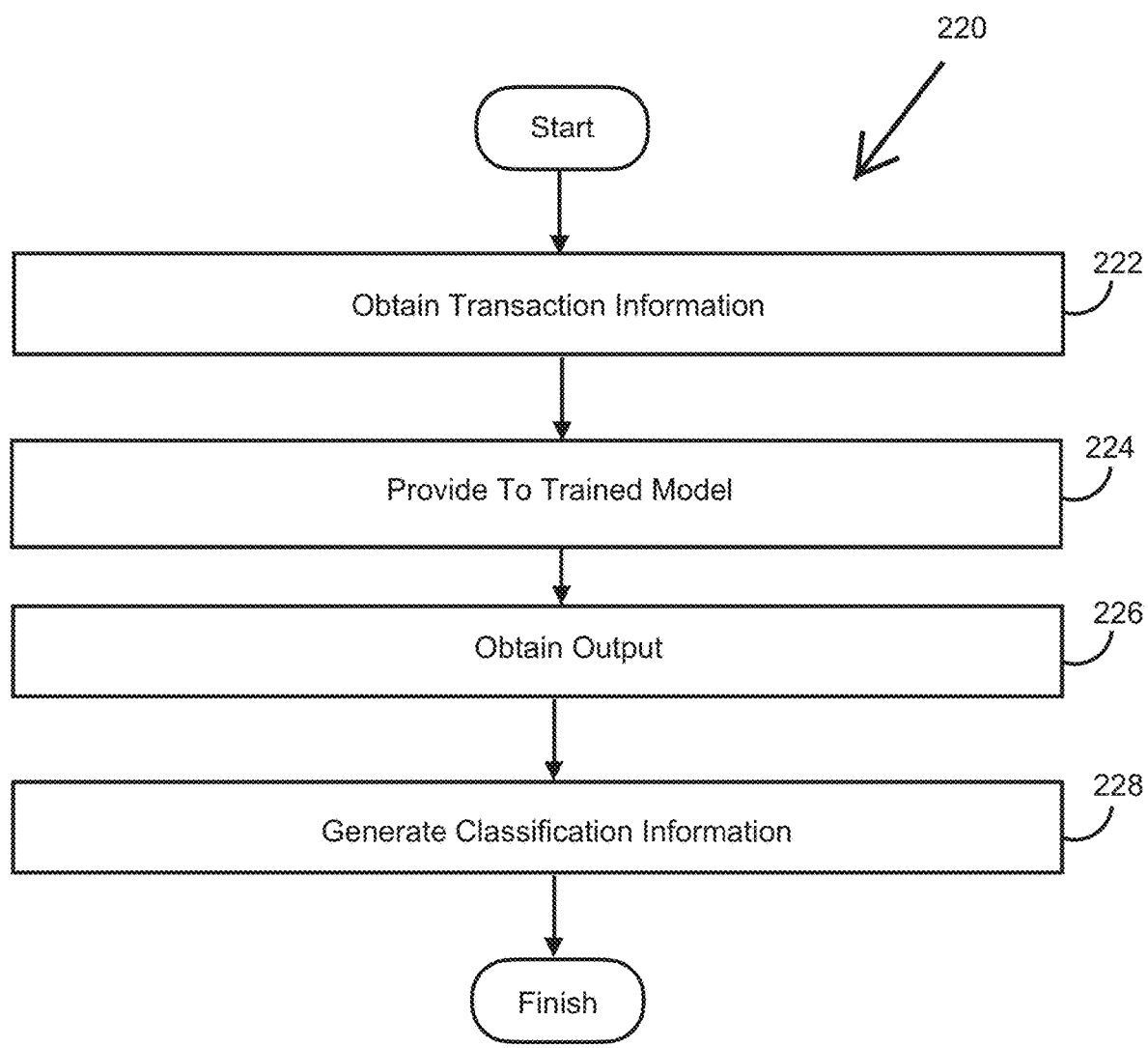
FIG. 2b illustrates a method to utilize a trained machine learning model to classify smart contracts in transactions recorded in immutable distributed electronic storage, in accordance with one or more implementations.

FIG. 2b illustrates method 220 to utilize a trained machine learning model to classify smart contracts in transactions recorded in immutable distributed electronic storage, in accordance with one or more implementations. The operations of method 220 presented below are intended to be illustrative. In some implementations, method 220 may be accomplished with one or more additional operations not described, and/or without one or more of the operations discussed. Additionally, the order in which the operations of method 220 are illustrated in FIG. 2b and described below is not intended to be limiting.

In some implementations, method 220 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 220 in response to instructions stored electronically on an electronic storage medium. The one or more processing devices may include one or more devices configured through hardware, firmware, and/or software to be specifically designed for execution of one or more of the operations of method 220.

An operation 222 may obtain transaction information characterizing transactions recorded on a transaction log stored in immutable distributed electronic storage. The transaction information may identify addresses associated with the transactions and/or include other characterizations. The transaction information may include second transaction information which characterizes a second transaction and identifies a first address and/or other addresses. Operation 222 may be performed by one or more hardware processors configured by machine-readable instructions including a component that is the same as or similar to transaction component 108 (shown in FIG. 1 and described herein), in accordance with one or more implementations.

An operation 224 may provide the transaction information as input into a trained machine learning model. The trained machine learning model may have been trained to provide output comprising contract classes of the transactions. Individual transactions may be classified in individual contract classes. By way of non-limiting illustration, the second transaction information may be provided as the input into the trained machine learning model. Operation 224 may be performed by one or more hardware processors configured by machine-readable instructions including a component that is the same as or similar to model component 111 (shown in FIG. 1 and described herein), in accordance with one or more implementations.

An operation 226 may obtain the output from the trained machine learning model. Operation 226 may be performed by one or more hardware processors configured by machine-readable instructions including a component that is the same as or similar to model component 111 (shown in FIG. 1 and described herein), in accordance with one or more implementations.

An operation 228 may generate, from the output, classification information. The classification information may include contract classes of the transactions. The classification information may identify the first contract class of the second transaction based on the output of the trained machine learning model. Operation 228 may be performed by one or more hardware processors configured by machine-readable instructions including a component that is the same as or similar to classification component 109 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to train and utilize a machine learning model to classify smart contracts in transactions recorded in immutable distributed electronic storage, the system comprising:
    one or more processors configured by machine-readable instructions to:
        obtain transaction information characterizing transactions recorded on a transaction log stored in immutable distributed electronic storage, wherein the transaction information includes first transaction information which characterizes a first transaction;
        obtain classification information identifying contract classes of the transactions, individual transactions being classified in individual contract classes, wherein the classification information includes first classification information which identifies a first contract class for the first transaction;
        aggregate the transaction information and the classification information into model training information;
        provide the model training information to a machine learning model to train the machine learning model and generate a trained machine learning model, the trained machine learning model being trained to generate output comprising the contract classes of new transactions;
        effectuate storage of the trained machine learning model;
        obtain new transaction information characterizing the new transactions recorded on the transaction log, wherein the new transaction information includes first new transaction information which characterizes a second transaction and identifies a first address;
        provide the new transaction information as input into the trained machine learning model, such that the first new transaction information is provided as the input into the trained machine learning model;
        obtain the output from the trained machine learning model;
        generate, from the output, new classification information, the new classification information including the contract classes of the new transactions, wherein the new classification information includes first new classification information which identifies the first contract class of the second transaction based on the output of the trained machine learning model;
        generate user interface information defining instances of a graphical user interface through which the transactions are represented as a graph, the graphical user interface displaying, within a field of two or more dimensions, at least a graph portion of the graph, wherein graph nodes within the graph represent the addresses, and the graph nodes are presented with one or more visual characteristics assigned to the addresses based on the contract classes, such that the user interface information defines a first instance of the graphical user interface through which the second transaction is represented in a first graph portion of the graph, the first instance of the graphical user interface displaying a first graph node representing the first address;
        establish one or more network connections with remotely located client computing platforms associated with users; and
        effectuate communication of the user interface information to the remotely located client computing platforms associated with the users to cause the remotely located client computing platforms to present the instances of the graphical user interface, such that the user interface information defining the first instance of the graphical user interface is communicated to a first remotely located client computing platform over a first network connection to cause the first remotely located client computing platform to display the first graph portion including the first graph node presented with a first visual characteristic.

2. The system of claim 1, wherein the contract classes include one or more of an exchange contract class, a liquidity contract class, a bridge contract class, a gambling contract class, a stake contract class, a proxy contract class, an initial offering contract class, or a factory contract class.

3. The system of claim 2, wherein the transaction information included in the model training information includes transaction feature values of transaction features of the transactions, the transaction features including one or more of an address feature, a timing feature, a value transferred feature, a fee feature, a function call feature, a contract parameter feature, a transaction frequency feature, a transaction volume feature, a transaction flow feature, or a user interaction feature.

4. The system of claim 3, wherein aggregating the transaction information and the classification information into the model training information includes generating correspondence information, the correspondence information defining correspondences between the transaction feature values and the contract classes, such that the correspondence information includes:

a first correspondence between a first set of transaction feature values of a first set of the transactions and the exchange contract class;

a second correspondence between a second set of transaction feature values of a second set of the transactions and the liquidity contract class;

a third correspondence between a third set of transaction feature values of a third set of the transactions and the bridge contract class;

a fourth correspondence between a fourth set of transaction feature values of a fourth set of the transactions and the gambling contract class;

a fifth correspondence between a fifth set of transaction feature values of a fifth set of the transactions and the stake contract class;

a sixth correspondence between a sixth set of transaction feature values of a sixth set of the transactions and the proxy contract class;

a seventh correspondence between a seventh set of transaction feature values of a seventh set of the transactions and the initial offering contract class; and an eighth correspondence between an eighth set of transaction feature values of an eighth set of the transactions and the factory contract class.

5. The system of claim 1, wherein the one or more physical processors are further configured by the machine-readable instructions to:

generate address classification information specifying the contract classes of the addresses identified in the new transactions, individual addresses being classified in the individual contract classes of individual new transactions in which they are identified, wherein the address classification information includes first new classification information which identifies the first contract class for the first address by virtue of the first contract class of the second transaction;

assign the one or more visual characteristics to the individual addresses based on the individual contract classes, such that the first address is assigned the first visual characteristic based on classification in the first contract class.

6. The system of claim 1, wherein second new transaction information characterizes a third transaction and identifies a second address, and the one or more physical processors are further configured by the machine-readable instructions to:

provide the second new transaction information as the input into the trained machine learning model;

generate, from the output, the new classification information including a second contract class of the third transaction; and assign a second visual characteristic to the second address.

7. The system of claim 6, wherein the first visual characteristic is a first shape and the second visual characteristic is a second shape; or wherein the first visual characteristic is a first color and the second visual characteristic is a second color.

8. A method to train and utilize a machine learning model to classify smart contracts in transactions recorded in immutable distributed electronic storage, the method being implemented in a computer system comprising one or more physical processors, the method comprising:

obtaining, by one or more physical processors, transaction information characterizing transactions recorded on a transaction log stored in immutable distributed electronic storage, wherein the transaction information includes first transaction information which characterizes a first transaction;

obtaining, by the one or more physical processors, classification information identifying contract classes of the transactions, individual transactions being classified in individual contract classes, wherein the classification information includes first classification information which identifies a first contract class for the first transaction;

aggregating, by the one or more physical processors, the transaction information and the classification information into model training information;

providing, by the one or more physical processors, the model training information to a machine learning model to train the machine learning model and generate a trained machine learning model, the trained machine learning model being trained to generate output comprising the contract classes of new transactions;

effectuating, by the one or more physical processors, storage of the trained machine learning model;

obtaining, by the one or more physical processors, new transaction information characterizing the new transactions recorded on the transaction log, wherein the new transaction information includes first new transaction information which characterizes a second transaction and identifies a first address;

providing, by the one or more physical processors, the new transaction information as input into the trained machine learning model, including providing the first new transaction information as the input into the trained machine learning model;

obtaining, by the one or more physical processors, the output from the trained machine learning model;

generating, by the one or more physical processors and from the output, new classification information, the new classification information including the contract classes of the new transactions, wherein the new classification information includes first new classification information which identifies the first contract class of the second transaction based on the output of the trained machine learning model;

generating, by the one or more physical processors, user interface information defining instances of a graphical user interface through which the transactions are represented as a graph, the graphical user interface displaying, within a field of two or more dimensions, at least a graph portion of the graph, wherein graph nodes within the graph represent the addresses, and the graph nodes are presented with one or more visual characteristics assigned to the addresses based on the contract classes, such that the user interface information defines a first instance of the graphical user interface through which the second transaction is represented in a first graph portion of the graph, the first instance of the graphical user interface displaying a first graph node representing the first address;

establishing, by the one or more physical processors, one or more network connections with remotely located client computing platforms associated with users; and effectuating, by the one or more physical processors, communication of the user interface information to the remotely located client computing platforms associated with the users to cause the remotely located client computing platforms to present the instances of the graphical user interface, such that the user interface information defining the first instance of the graphical user interface is communicated to a first remotely located client computing platform over a first network connection to cause the first remotely located client computing platform to display the first graph portion including the first graph node presented with a first visual characteristic.

9. The method of claim 8, wherein the contract classes include one or more of an exchange contract class, a liquidity contract class, a bridge contract class, a gambling contract class, a stake contract class, a proxy contract class, an initial offering contract class, or a factory contract class.

10. The method of claim 9, wherein the transaction information included in the model training information includes transaction feature values of transaction features of the transactions, the transaction features including one or more of an address feature, a timing feature, a value transferred feature, a fee feature, a function call feature, a contract parameter feature, a transaction frequency feature, a transaction volume feature, a transaction flow feature, or a user interaction feature.

11. The method of claim 10, wherein the aggregating the transaction information and the classification information into the model training information includes generating correspondence information, the correspondence information defining correspondences between the transaction feature values and the contract classes, wherein the correspondence information includes:
  a first correspondence between a first set of transaction feature values of a first set of the transactions and the exchange contract class;
  a second correspondence between a second set of transaction feature values of a second set of the transactions and the liquidity contract class;
  a third correspondence between a third set of transaction feature values of a third set of the transactions and the bridge contract class;
  a fourth correspondence between a fourth set of transaction feature values of a fourth set of the transactions and the gambling contract class;
  a fifth correspondence between a fifth set of transaction feature values of a fifth set of the transactions and the stake contract class;
  a sixth correspondence between a sixth set of transaction feature values of a sixth set of the transactions and the proxy contract class;
  a seventh correspondence between a seventh set of transaction feature values of a seventh set of the transactions and the initial offering contract class; and
  an eighth correspondence between an eighth set of transaction feature values of an eighth set of the transactions and the factory contract class.

12. The method of claim 8, further comprising:
  generating address classification information specifying the contract classes of the addresses identified in the new transactions, individual addresses being classified in the individual contract classes of individual new transactions in which they are identified, wherein the address classification information includes first new classification information which identifies the first contract class for the first address by virtue of the first contract class of the second transaction;
  assigning the one or more visual characteristics to the individual addresses based on the individual contract classes, such that the first address is assigned the first visual characteristic based on classification in the first contract class.

13. The method of claim 8, wherein second new transaction information characterizes a third transaction and identifies a second address, and wherein the method further comprises:
  providing the second new transaction information as the input into the trained machine learning model;
  generating, from the output, the new classification information including a second contract class of the third transaction; and
  assigning a second visual characteristic to the second address.

14. The method of claim 13, wherein the first visual characteristic is a first shape and the second visual characteristic is a second shape; or wherein the first visual characteristic is a first color and the second visual characteristic is a second color.

15. The method of claim 8, wherein the transactions are recorded on the transaction log with smart contract code.

* * * * *